US007930092B2

(12) United States Patent
Tokugawa et al.

(10) Patent No.: US 7,930,092 B2
(45) Date of Patent: Apr. 19, 2011

(54) CONTROL APPARATUS FOR INTERNAL COMBUSTION ENGINE

(75) Inventors: Kazuhito Tokugawa, Utsunomiya (JP); Shinichi Ishikawa, Utsunomiya (JP); Tomoo Shimokawa, Utsunomiya (JP); Katsuaki Wachi, Sendai (JP); Satoshi Chida, Utsunomiya (JP); Hiroyuki Utsumi, Utsunomiya (JP); Takayuki Aoki, Utsunomiya (JP)

(73) Assignee: Keihin Corporation (JP)

( * ) Notice: Subject to any disclaimer, the term of this patent is extended or adjusted under 35 U.S.C. 154(b) by 266 days.

(21) Appl. No.: 12/200,683

(22) Filed: Aug. 28, 2008

(65) Prior Publication Data

US 2009/0063014 A1 Mar. 5, 2009

(30) Foreign Application Priority Data

Aug. 29, 2007 (JP) ................................ 2007-223192

(51) Int. Cl.
*B60T 7/12* (2006.01)

(52) U.S. Cl. ................. 701/113; 123/179.1; 123/406.18

(58) Field of Classification Search .................. 703/112, 703/113; 123/491, 179.1, 179.4, 406.18, 123/406.24

See application file for complete search history.

(56) References Cited

U.S. PATENT DOCUMENTS

| | | | | |
|---|---|---|---|---|
| 7,231,908 | B2 * | 6/2007 | Namari et al. | 123/491 |
| 7,474,035 | B2 * | 1/2009 | Fukagawa et al. | 310/316.03 |
| 7,540,264 | B2 * | 6/2009 | Degner et al. | 123/90.11 |
| 2005/0200202 | A1 * | 9/2005 | Mihara | 307/10.1 |
| 2005/0210866 | A1 * | 9/2005 | Ito et al. | 60/277 |
| 2006/0152180 | A1 * | 7/2006 | Tahara et al. | 318/139 |
| 2007/0296307 | A1 * | 12/2007 | Fukagawa et al. | 310/316.03 |
| 2009/0063008 | A1 * | 3/2009 | Ishikawa et al. | 701/102 |

FOREIGN PATENT DOCUMENTS

JP 2004-360631 12/2004

* cited by examiner

*Primary Examiner* — John T Kwon

(74) *Attorney, Agent, or Firm* — Cantor Colburn LLP

(57) ABSTRACT

A control apparatus for an internal combustion engine, includes: a fuel injection unit; an ignition unit; a crank angle detection unit; a fuel pump; a booster unit; an ignition discharge unit; and a control unit that controls the fuel injection unit, the ignition unit, and the fuel pump, that ascertains ignition timings based on crank signals output from the crank angle detection unit, and that performs a startup control sequence that is made up of fuel injection processing, voltage boosting processing, ignition processing, and fuel supply processing.

14 Claims, 13 Drawing Sheets

IN KICK-START STARTUP OPERATION (NO BATTERY)

SELF-STARTER STARTUP OPERATION (USING BATTERY)

CONTROL APPARATUS FOR INTERNAL COMBUSTION ENGINE

This application is based on and claims priority from Japanese Patent Application No. 2007-223192, filed on Aug. 29, 2007, the contents of which are incorporated herein by reference.

BACKGROUND OF THE INVENTION

1. Field of the Invention

The present invention relates to a control apparatus for an internal combustion engine, and, in particular, to a control apparatus for an internal combustion engine that is used to control a four-stroke engine serving as an internal combustion engine.

2. Description of Related Art

In a batteryless vehicle which travels by an internal combustion engine, electric power which is required at startup is fully provided by generated power from a generator that is driven by the rotation of the crankshaft of the internal combustion engine.

Because of this, it is necessary to complete startup control using limited power.

Accordingly, when a batteryless vehicle is being started up, it is desirable for power consumption to be kept as low as possible.

Techniques to control the startup of a conventional batteryless vehicle are the techniques described in (1) and (2) (see below) in which power consumption is controlled so that startability is guaranteed.

(1) A technique is disclosed in Japanese Patent No. 3201684 in which, in a batteryless vehicle, a switch is provided that is used to start or stop the supply of generated power to loads other than ignition, and the opening and closing of this switch is controlled in accordance with the engine speed.

(2) A technique is disclosed in Japanese Unexamined Patent Application, First Publication No. 2004-360631 in which, in a batteryless vehicle that employs a DC-CDI (i.e., a condenser discharge type) ignition system, when a power supply voltage that is supplied by a generator increases to a predetermined value (i.e., a booster operation permitting voltage), then a booster operation of the condenser voltage is started using a DC converter of the DC-CDI ignition system.

Among internal combustion engines that are started by manual cranking, for example, four-stroke single-cylinder engines, internal combustion engines exist that are only able to be cranked approximately three revolutions in a single startup operation.

In this type of internal combustion engine, it is essential in order to ensure startability for ignition to take place at the top dead center of the initial compression.

However, as described above, the power supply of an ECU (Engine Control Unit) of a batteryless vehicle is supplied from a generator that is driven by the rotation of a crankshaft.

Because of this, when the boosting of a condenser of a DC-CDI ignition system is started, the power supple voltage is reduced, and the problem sometimes arises that the power supply voltage drops below the minimum operating voltage of the CPU (Central Processing Unit) inside the ECU, so that the functions of the ignition system are stopped and the ignition opportunity at the top dead center of the initial compression is lost.

In order to avoid such problems, consideration has been given to increasing the capacity of the generator. However, this solution is not preferable as it tends to lead to an increase in both the size of the generator and the cost thereof.

In the technique disclosed in Japanese Patent No. 3201684, no switch is provided in order to start or stop the supply of generated power to the ignition system. Because of this, when this system is applied to a fuel injection system, there is insufficient ignition output due to CPU voltage reduction.

Moreover, when the ignition system disclosed in Japanese Unexamined Patent Application, First Publication No. 2004-360631 is applied to a fuel injection system, startup is not possible unless fuel injection is given precedence and is performed prior to ignition output.

Because of this, unless consideration is given to both voltage reduction that is caused by the fuel pump and the injector being driven and voltage reduction that is caused by the operation to boost the condenser voltage performed by the DC converter, then it is not possible to set a voltage booster operation permitting voltage.

Moreover, it is difficult to avoid a reduction in the CPU voltage simply by setting an permitting voltage for the supply of power to each device such as the ignition system, the fuel pump, and the injector, and the possibility remains that this will deteriorate into a situation in which startup is not possible.

SUMMARY OF THE INVENTION

The invention was conceived in view of the above-described circumstances and it is an object thereof to provide a control apparatus for an internal combustion engine that, when an internal combustion engine is being started, prevents any stopping of electronic control functions which is caused by a drop in the power supply voltage, and that is able to ensure startability.

In order to achieve the above-described object, the control apparatus for an internal combustion engine according to a first aspect of the invention, includes: a fuel injection unit provided in the internal combustion engine; an ignition unit provided in the internal combustion engine; a crank angle detection unit that is provided in the internal combustion engine, and that outputs a crank signal each time a crankshaft rotates by a predetermined angle; a fuel pump used to supply fuel to the fuel injection unit; a booster unit that boosts a power supply voltage; an ignition discharge unit that charges an ignition condenser using the boosted power supply voltage, and discharges power with which the ignition condenser has been charged to the ignition unit at the ignition timings; and a control unit that controls the fuel injection unit, the ignition unit, and the fuel pump, that ascertains ignition timings based on the crank signals output from the crank angle detection unit, and that performs a startup control sequence that is made up of: fuel injection processing in which the fuel injection unit is driven so as to perform the initial fuel injection; voltage boosting processing in which, after the fuel injection processing, the booster unit is controlled so as to boost the power supply voltage; ignition processing in which, after the voltage boosting processing, the ignition discharge unit is controlled so as to discharge to the ignition unit the power with which the ignition condenser has been charged when the ignition timings arrive; and fuel supply processing in which, after the ignition processing, the fuel pump is driven so as to supply fuel to the fuel injection unit.

Moreover, it is preferable that, in the control apparatus for an internal combustion engine according to the first aspect of the invention, after the fuel injection processing, the control unit determine based on the crank signals whether or not a period between the crank signal from the previous crank signal detection and the crank signal from the current crank signal detection is equal to or less than a predetermined value, and when the period between the crank signals is equal to or less than the predetermined value, the control unit perform the voltage boosting processing.

Moreover, it is preferable that the control apparatus for an internal combustion engine according to the first aspect of the invention further include: a power supply voltage measuring unit that measures the power supply voltage. In the control apparatus, after the ignition processing, the control unit determines whether or not the power supply voltage is equal to or greater than a fuel pump drive permitting voltage, and when the power supply voltage is equal to or greater than the fuel pump drive permitting voltage, the control unit performs the fuel supply processing.

In order to achieve the above-described object, the control apparatus for an internal combustion engine according to a second aspect of the invention, includes: a fuel injection unit provided in the internal combustion engine; an ignition unit provided in the internal combustion engine; a crank angle detection unit that is provided in the internal combustion engine, and that outputs a crank signal each time a crankshaft rotates by a predetermined angle; a fuel pump used to supply fuel to the fuel injection unit; a booster unit that boosts a power supply voltage; an ignition discharge unit that charges an ignition condenser using the boosted power supply voltage, and discharges power with which the ignition condenser has been charged to the ignition unit at the ignition timings; a power supply voltage measuring unit that measures the power supply voltage; a control unit that controls the fuel injection unit, the ignition unit, and the fuel pump, that ascertains ignition timings based on the crank signals output from the crank angle detection unit, and that performs a startup control sequence that is made up of: fuel injection processing in which the fuel injection unit is driven so as to perform the initial fuel injection; voltage boosting processing in which, after the fuel injection processing, the booster unit is controlled so as to boost the power supply voltage; and fuel supply processing in which, after the voltage boosting processing, when the power supply voltage is equal to or greater than the fuel pump drive permitting voltage, the fuel pump is driven so as to supply fuel to the fuel injection unit.

Moreover, it is preferable that, in the control apparatus for an internal combustion engine according to the second aspect of the invention, after the fuel injection processing, the control unit determine based on the crank signals whether or not a period between the crank signal from the previous crank signal detection and the crank signal from the current crank signal detection is equal to or less than a predetermined value, and when the period between the crank signals is equal to or less than the predetermined value, the control unit perform the voltage boosting processing. In the control apparatus, when the period between the crank signals is greater than the predetermined value, the control unit does not perform the voltage boosting processing. In the control apparatus, when the power supply voltage is equal to or greater than the fuel pump drive permitting voltage, the control unit performs the fuel supply processing.

Moreover, it is preferable that, in the control apparatus for an internal combustion engine according to the second aspect of the invention, after the fuel supply processing, when the ignition timing arrives, the control unit determine whether or not the voltage boosting processing has been executed, and when the voltage boosting processing has been executed, the control unit control the ignition discharge unit so as to discharge to the ignition unit the power with which the ignition condenser has been charged.

Moreover, it is preferable that, in the control apparatus for an internal combustion engine according to the second aspect of the invention, when the power supply voltage is greater than the fuel pump drive permitting voltage, the control unit omit the fuel supply processing, and when the ignition timing arrives, the control unit determine whether or not the voltage boosting processing has been executed, and when the voltage boosting processing has been executed, the control unit perform the ignition processing.

Moreover, it is preferable that, in the control apparatus for an internal combustion engine according to the second aspect of the invention, after the ignition processing, the control unit determine whether or not the fuel supply processing has been executed, and when the fuel supply processing has not been executed, and when the power supply voltage is equal to or greater than the fuel pump drive permitting voltage, the control unit perform the fuel supply processing.

Moreover, it is preferable that, in the control apparatus for an internal combustion engine according to the first or second aspects of the invention, after the control unit has been activated, the control unit perform battery existence determination processing to determine whether a battery that supplies the power supply voltage is present, and if the control unit determined that no battery is present, the control unit execute the startup control sequence.

Moreover, it is preferable that the control apparatus for an internal combustion engine according to the first or second aspects of the invention further include: a power supply voltage measuring unit that measures the power supply voltage. In the control apparatus, in the battery existence determination processing, when the control unit determines that the power supply voltage at activation is equal to or less than a predetermined value, the control unit determines that no battery is present.

Moreover, it is preferable that, in the control apparatus for an internal combustion engine according to the first or second aspects of the invention, in the battery existence determination processing, when the crank signal is input within a predetermined time after activation, the control unit determine that no battery is present.

According to the invention, because the driving of the fuel pump (i.e., the fuel supply processing) which consumes the largest amount of power is performed last in the startup control sequence, at the top dead center of the initial compression that requires an ignition output, it is possible to prevent the power supply voltage dropping below the minimum operating voltage of the control unit.

Namely, it is possible to prevent the electronic control functions of the control unit being halted, and to perform normal ignition output at the top dead center of the initial compression so that startability can be ensured.

Accordingly, in the invention, it is possible to effectively use the limited voltage (i.e., the power supply voltage) generated by a generator so that, as a result, it is possible to ensure superior startability without this leading to an increase in the size of the generator or in costs.

DETAILED DESCRIPTION OF THE INVENTION

An embodiment of the invention will be described with reference made to the drawings.

Figure 1:
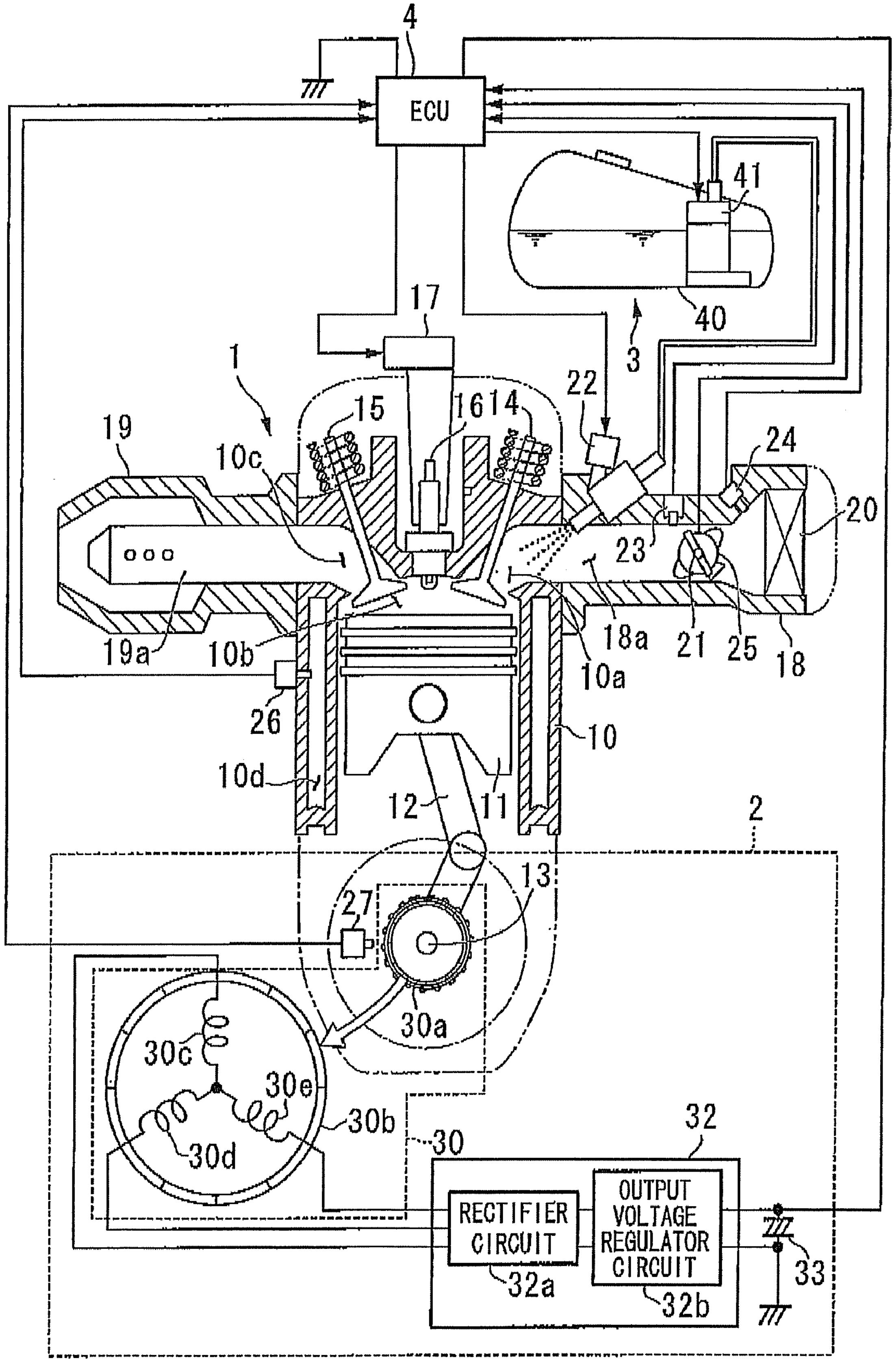
FIG. 1 is a structural schematic view showing an engine system that is provided with a control apparatus for an internal combustion engine (ECU 4) according to an embodiment of the invention.

FIG. 1 is a structural schematic view showing an engine control system that is provided with the internal combustion engine control apparatus (referred to below as an ECU) of the embodiment.

As shown in FIG. 1, the engine control system of the embodiment is schematically formed by an engine 1, a power supply unit 2, a fuel supply unit 3, and an ECU (Engine Control Unit) 4.

A batteryless system that is not provided with a battery, bat instead performs engine startup by manual cranking (for example, by kick-starting) is described as an example of the engine control system of the embodiment.

The engine (i.e., internal combustion engine) 1 is a four-stroke single-cylinder engine, and schematically includes a cylinder 10, a piston 11, a conrod 12, a crankshaft 13, an intake valve 14, an exhaust valve 15, a spark plug 16, an ignition coil 17, an intake pipe 18, an exhaust pipe 19, an air cleaner 20, a throttle valve 21, an injector 22, an intake pressure sensor 23, an intake temperature sensor 24, a throttle opening angle sensor 25, a cooling water temperature sensor 26, and a crank angle sensor 27.

The cylinder 10 is a hollow circular cylinder-shaped component that is used to make the piston 11 that is located inside it undergo a reciprocating motion by repeating a four-stroke cycle consisting of intake, compression, combustion (i.e., expansion), and exhaust.

The cylinder 10 has an intake port 10*a*, a combustion chamber 10*b*, and an exhaust port 10*c*.

The intake port 10*a* is a flow path that is used to supply a mixture formed from air and fuel to the combustion chamber 10*b*.

The combustion chamber 10*b* is a space that is used to store the aforementioned mixture and cause mixture that has been compressed in the compression stroke to be combusted in the combustion stroke.

The exhaust port 10*c* is a flow path that is used to discharge exhaust gas from the combustion chamber 10*b* to the outside in the exhaust stroke.

Moreover, a water cooling path 10*d* that is used to circulate cooling water is provided in an outer wall of the cylinder 10.

The crankshaft 13 that is used to convert the reciprocating motion of the piston 11 into rotational motion is joined via the conrod 12 to the piston 11.

The crankshaft 13 extends in a direction that is orthogonal to the reciprocation direction of the piston 11. A flywheel (not shown), a mission gear, a kick gear that is joined to a kick pedal that is used to start the engine 1 manually, and a rotor 30*a* of the power supply unit 2 (described below) are joined to the crankshaft 13.

The intake valve 14 is a valve component that is used to open and close an aperture portion of the air intake port 10*a* which is near to the combustion chamber 10*b*, and is joined to a camshaft (not shown). The intake valve 14 is driven to open and close in accordance with the respective strokes by this camshaft.

The exhaust valve 15 is a valve component that is used to open and close an aperture portion of the air exhaust port 10*c* which is near to the combustion chamber 10*b*, and is joined to a camshaft (not shown). The exhaust valve 15 is driven to open and close in accordance with the respective strokes by this camshaft.

The spark plug 16 has electrodes that face towards the interior of the combustion chamber 10*b*, and is provided in a topmost portion of the combustion chamber 10*b*. The spark plug 16 generates a spark between the electrodes by a high-voltage ignition voltage signal that is supplied from the ignition coil 17.

The ignition coil 17 is a transformer that is formed by a primary coil and a secondary coil. The ignition coil 17 boosts an ignition voltage signal that is supplied from the ECU 4 to the primary coil, and supplies an ignition voltage signal from the secondary coil to the spark plug 16.

The spark plug 16 and the ignition coil 17 correspond to an ignition unit of the invention.

The intake pipe 18 is an air supply pipe, and has an intake flow path 18*a* provided inside it.

The intake pipe 18 is joined to the cylinder 10 so that the intake flow path 18*a* is connected to the intake port 10*a*.

The exhaust pipe 19 is a pipe for discharging exhaust gas, and has an exhaust flow path 19*a* provided inside it.

The exhaust pipe 19 is joined to the cylinder 10 so that the exhaust flow path 19*a* is connected to the exhaust port 10*c*.

The air cleaner 20 is located upstream from the air flowing through the interior of the intake pipe 18.

The air cleaner 20 purifies air taken in from the outside and supplies it to the intake flow path 18*a*.

The throttle valve 21 is provided inside the intake flow path 18*a*, and pivots by a throttle (not shown) or an accelerator.

Namely, the cross-sectional area of the intake flow path 18*a* is changed by the pivoting of the throttle valve 21, and the air intake quantity is accordingly changed.

The injector (i.e., a fuel injection unit) 22 has an injection aperture that injects fuel that is supplied from the fuel supply unit 3 in accordance with injector drive signals that are supplied from the ECU 4.

The injector 22 is provided inside the intake pipe 18 so that the injection aperture faces the intake port 10*a*.

The intake pressure sensor 23 is, for example, a semiconductor pressure sensor that utilizes a piezoresistive effect.

The intake pressure sensor 23 is provided in the intake pipe 18 at a position downstream from the airflow passing through the throttle valve 21 so that a sensitive surface of the intake pressure sensor 23 is oriented towards the intake flow path 18*a*.

The intake pressure sensor 23 outputs intake pressure signals that correspond to the intake pressure inside the intake pipe 18 to the ECU 4.

The intake temperature sensor 24 is provided in the intake pipe 18 at a position upstream from the airflow passing through the throttle valve 21 so that a sensitive portion of the intake temperature sensor 24 is oriented towards the intake flow path 18*a*.

The intake temperature sensor 24 outputs intake temperature signals that correspond to the intake air temperature inside the intake pipe 18 to the ECU 4.

The throttle opening angle sensor 25 outputs throttle opening angle signals that correspond to the opening angle of the throttle valve 21 to the ECU 4.

The cooling water temperature sensor 26 is provided so that a sensitive portion of the cooling water temperature sensor 26 is oriented towards the cooling water path 10*d* of the cylinder 10.

The cooling water temperature sensor 26 outputs cooling water temperature signals that correspond to the temperature of the cooling water flowing through the cooling water path 10*d* to the ECU 4.

The crank angle sensor (i.e., a crank angle detection unit) 27 outputs a crank signal each time the crankshaft 13 rotates by a predetermined angle in synchronization with the rotation of the crankshaft 13. The crank angle sensor 27 is described in detail below.

The power supply unit 2 includes a generator 30, a regulate rectifier 32, and a condenser 33.

The generator 30 is a magnetic AC generator and includes a rotor 30*a*, permanent magnets 30*b*, and 3-phase stator coils 30*c*, 30*d*, and 30*e*.

The rotor 30*a* is joined to the crankshaft 13 of the engine 1 and rotates in synchronization therewith.

The permanent magnets 30*b* are mounted on an inner circumferential side of the rotor 30*a*.

The 3-phase stator coils 30*c*, 30*d*, and 30*e* are coils that are used to obtain generated output.

Namely, in the generator 30, as a result of the rotor 30*a* (in other words, the permanent magnets 30*b*) rotating relative to the fixed stator coils 30*c*, 30*d*, and 30*e*, 3-phase AC voltage is generated by electromagnetic induction from the stator coils 30*c*, 30*d*, and 30*e*. The generated 3-phase AC voltage is output to the regulate rectifier 32.

Figure 2:
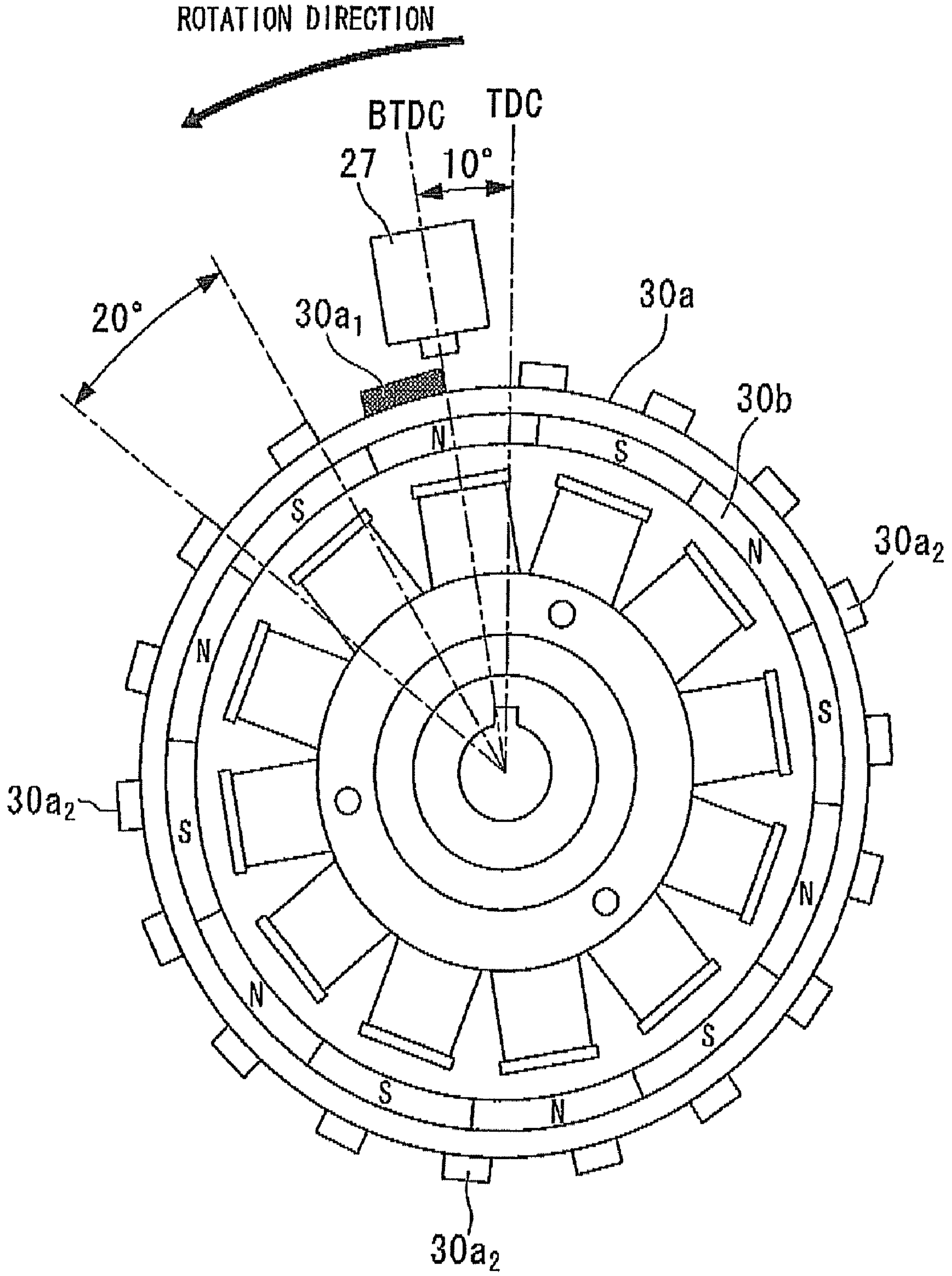
FIG. 2 is a detailed explanatory diagram showing a rotor **30*a* constituting a generator 30** according to an embodiment of the invention.

As shown in FIG. 2, a plurality of projections is formed on an outer circumference of the rotor 30*a* extending in the rotation direction of the rotor 30*a*.

Specifically, a plurality of projections (i.e., auxiliary projections) 30$a_2$ whose length is shorter in the rotation direction, and a projection (i.e., a crank angle reference projection) 30$a_1$ whose length in the rotation direction is longer than that of the projections 30$a_2$, are formed on the outer circumference of the rotor 30*a*.

Here, the length of the crank angle reference projection 30$a_1$ is, as an example, approximately twice the length of the auxiliary projections 30$a_2$.

The plurality of auxiliary projections 30$a_2$ and the crank angle reference projection 30$a_1$ are provided so that the respective rear ends of each of the plurality of auxiliary projections 30$a_2$ and the crank angle reference projection 30$a_1$ are located at the same angular interval (for example, at 20° intervals).

In the embodiment, the crank angle reference position is a position to the front in the rotation direction of a position corresponding to the top dead center TDC, for example, the position BTDC 10° which is a position 10° before the top dead center.

In addition, the position of the rear end of the crank angle reference projection 30$a_1$ matches the crank angle reference position.

Moreover, the permanent magnets 30*b* are mounted on the inner circumferential side of the rotor 30*a*.

Specifically, the permanent magnets 30*b* that are constructed with an N pole and an S pole forming one set are placed every 60° along the inner circumferential side of the rotor 30*a*.

The aforementioned crank angle sensor 27 is, for example, an electromagnetic pickup sensor and, as shown in FIG. 2, is provided in the vicinity of the outer circumference of the rotor 30*a*.

The crank angle sensor 27 outputs a pair of pulse signals having mutually different polarities each time the crank angle reference projection 30$a_1$ and the auxiliary projections 30$a_2$ pass the vicinity of the crank angle sensor 27.

More specifically, the crank angle sensor 27 outputs a pulse signal having a negative polarity amplitude when the front end of each projection goes past in the rotation direction, and outputs a pulse signal having a positive polarity amplitude when the rear end of each projection goes past in the rotation direction.

The description returns now to FIG. 1.

The regulate rectifier 32 includes a rectifier circuit 32*a* and an output voltage regulator circuit 32*b*.

The rectifier circuit 32*a* includes six rectifier circuits that are connected in a 3-phase bridge structure and are used to rectify the 3-phase AC voltage input from the respective stator coils 30*c*, 30*d*, and 30*e*. The rectifier circuit 32*a* rectifies this 3-phase AC voltage to DC voltage and outputs it to the output voltage regulator circuit 32*b*.

The output voltage regulator circuit 32*b* rectifies the DC voltage input from the rectifier circuit 32*a*, and generates power supply voltage for the ECU 4 which it then supplies to the ECU 4.

The condenser 33 is a smoothing condenser for stabilizing the power supply, and both ends thereof are connected between the output terminals of the output voltage regulator circuit 32*b*.

The fuel supply unit 3 is formed by a fuel tank 40 and a fuel pump 41.

The fuel tank 40 is a container that is used to hold fuel such as, for example, gasoline.

The fuel pump 41 is provided inside the fuel tank 40, and pumps out fuel inside the fuel tank 40 and supplies it to the injector 22 in accordance with pump drive signals input from the ECU 4.

Figure 3:
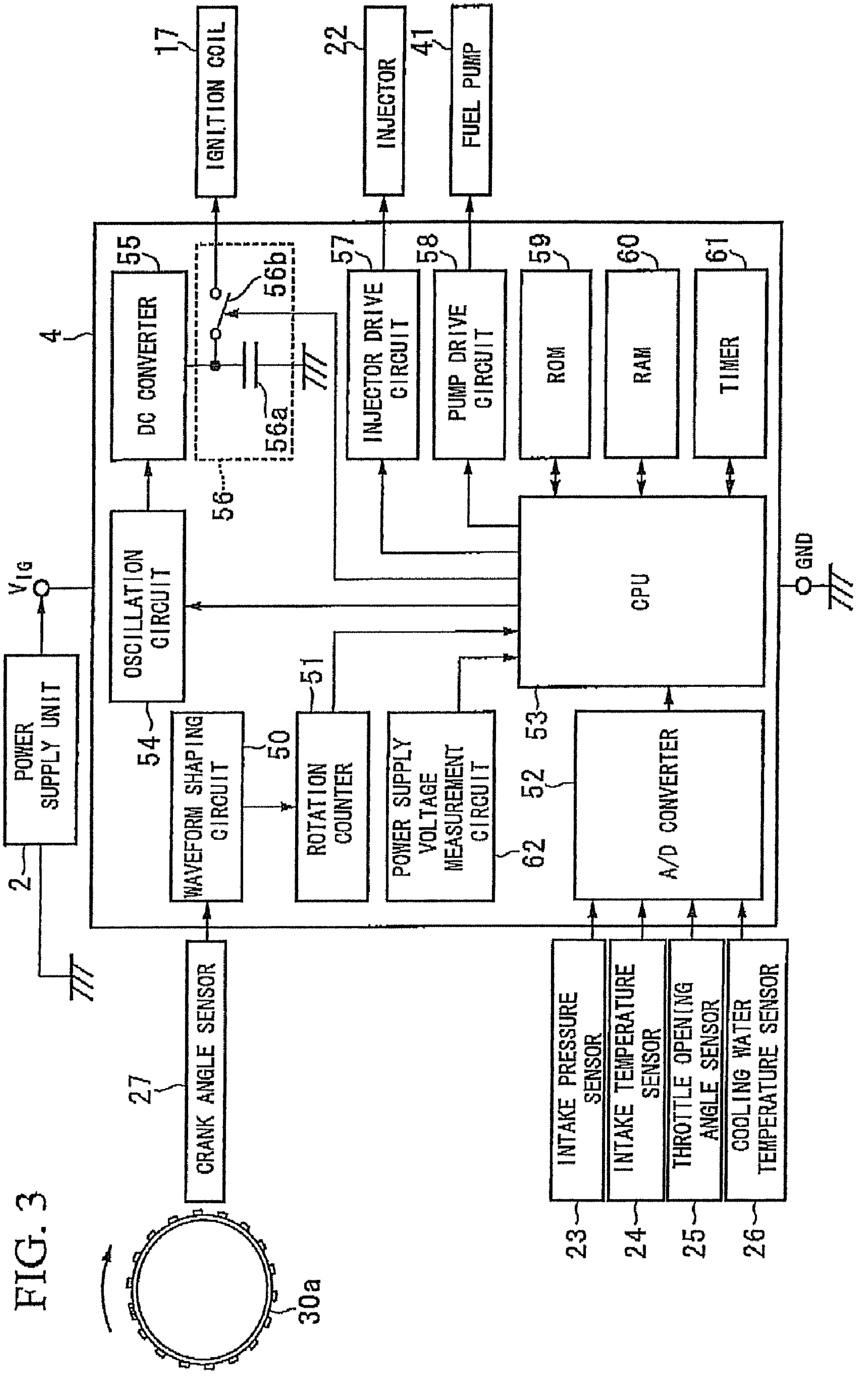
FIG. 3 is a structural block diagram showing a control apparatus for the internal combustion engine (ECU 4) according to an embodiment of the invention.

As shown in FIG. 3, the ECU 4 includes a waveform shaping circuit 50, a rotation counter 51, an A/D converter 52, a CPU (Central Processing Unit) 53, an oscillation circuit 54, a DC converter 55, an ignition circuit 56, an injector drive circuit 57, a pump drive circuit 58, ROM (Read Only Memory) 59, RAM (Random Access Memory) 60, a timer 61, and a power supply voltage measuring circuit 62.

The ECU 4 which is constructed in this manner is driven by power supply voltage that is supplied from the power supply unit 2.

A $V_{IG}$ terminal of the ECU 4 is connected to an output terminal on a positive pole side of the output voltage regulator circuit 32*b*.

A GND terminal of the ECU 4 is connected to a ground line and to an output terminal on a negative pole side of the output voltage regulator circuit 32*b*.

The waveform shaping circuit 50 performs waveform shaping to change pulse form crank signals that are input from the crank angle sensor 27 into rectangular wave pulse signals (for example, to change negative polarity crank signals into high level signals, and change positive polarity crank and ground level crank signals into low level signals), and outputs the waveform-shaped signals to the rotation counter 51 and the CPU 53.

Namely, these rectangular wave pulse signals are rectangular wave pulse signals whose cycle is the length of time it takes for the crankshaft 13 to rotate 20°.

The rotation counter 51 calculates the engine speed based on the rectangular wave pulse signals that are output from the above-described waveform shaping circuit 50, and outputs a rotation count signal that shows the relevant engine speed to the CPU 53.

The A/D converter 52 converts into digital signals intake pressure sensor outputs that are output from the intake pressure sensor 23, intake temperature sensor outputs that are output from the intake temperature sensor 24, throttle opening angle sensor outputs that are output from the throttle opening angle sensor 25, and cooling water temperature sensor outputs that are output from the cooling water temperature sensor 26, and then outputs these digital signals to the CPU 53.

The CPU (i.e., control unit) 53 executes an engine control program that is stored in the ROM 59, and performs control of the fuel injection, ignition, and fuel supply of the engine 1 based on the crank signals, the rotation count signals that are output from the rotation counter 51, the intake pressure values that have been converted by the A/D converter 52, the throttle opening angle values and cooling water temperature values, and on the power supply voltage values that are output from the power supply voltage measuring circuit 62.

Specifically, the CPU 53 outputs fuel injection control signals to the injector drive circuit 57 in order to cause a predetermined quantity of fuel to be injected from the injector 22 at the fuel injection timing. The CPU 53 also outputs voltage boost control signals to the oscillation circuit 54 prior to the ignition timing in order to start a voltage boosting operation by the DC converter 55, and also outputs ignition control signals to the ignition circuit 56 (more specifically, to an electrical discharge switch 56*b*) in order to cause the spark plug 16 to spark at the ignition timing. In addition, the CPU 53 outputs fuel supply control signals to the pump drive circuit 58 in order for fuel to be supplied to the injector 22.

The oscillation circuit 54 generates PWM (pulse width modulation) signals of a predetermined frequency in accordance with the voltage boost control signals input from the CPU 53, and outputs these PWM signals to the DC converter 55.

The DC converter (i.e., booster unit) 55 performs switching operations in accordance with the PWM signals that are input from the above-described oscillation circuit 54. As a result, the DC converter (i.e., booster unit) 55 boosts the $V_{IG}$ voltage, namely, the power supply voltage that is supplied from the regulate rectifier 32 to a predetermined voltage (for example, 250 V), and supplies this boosted power supply voltage (referred to below as a boosted power supply voltage) to the ignition circuit 56 (more specifically, to an ignition condenser 56*a*).

The ignition circuit (i.e., an ignition discharge unit which is used for ignition) 56 includes the ignition condenser 56*a* and the electrical discharge switch 56*b*.

The ignition condenser 56*a* is used to charge the boosted power supply voltage that is supplied from the above-described DC converter 55. One terminal (a first terminal) of the ignition condenser 56*a* is connected to a voltage output terminal of the DC converter 55. Another terminal (a second terminal) of the ignition condenser 56*a* is connected to a ground line.

The electrical discharge switch 56*b* is a switch (for example, a transistor) that switches on and off a connection between two terminals in accordance with ignition control signals that are input from the above-described CPU 53.

One terminal of the electrical discharge switch 56*b* is connected to one terminal of the ignition condenser 56*a*. The other terminal of the electrical discharge switch 56*b* is connected to a primary coil of the ignition coil 17.

The electrical discharge switch 56*b* is controlled by the CPU 53 so as to be in an OFF (i.e., non-connected) state when the ignition condenser 56*a* is being charged, and is controlled so as to be in an ON (i.e., connected) state at the ignition timings.

Namely, at the ignition timings, the power with which the ignition condenser 56*a* has been charged is discharged to the primary coil of the ignition coil 17 as an ignition voltage signal.

In this manner, in the embodiment, a DC-CDI system is used for the ignition system.

In accordance with fuel injection control signals that are input from the above-described CPU 53, the injector drive circuit 57 generates injector drive signals in order to cause a predetermined quantity of fuel to be injected from the injector 22, and outputs these injector drive signals to the injector 22.

In accordance with fuel supply control signals that are input from the CPU 53, the pump drive circuit 58 generates pump drive signals for causing fuel to be supplied from the fuel pump 41 to the injector 22, and outputs these pump drive signals to the fuel pump 41.

The ROM 59 is non-volatile memory in which engine control programs that are executed by the CPU 53 and various types of data are stored in advance.

The RAM 60 is working memory that is used to temporarily hold data when the CPU 53 is executing an engine control program and performing various operations.

The timer 61 performs predetermined timer (i.e., clock) operations under the control of the CPU 53.

The power supply voltage measuring circuit (power supply voltage measuring unit) 62 measures voltage values of the $V_{IG}$ voltage, namely, the power supply voltage that is supplied from the regulate rectifier 32, and outputs the measurement results to the CPU 53 as power supply voltage values.

Next, a description will be given of an operation performed when the engine 1 is being started up by the ECU 4 (in particular, by the CPU 53) in an engine control system that is provided with the ECU 4 (i.e., the internal combustion engine control apparatus) of the embodiment that is constructed in the manner described above.

Battery Existence Determination Processing

In the embodiment, because the engine control system is assumed to be a batteryless system, it is not possible for power supply voltage to be supplied to the ECU 4 unless 3-phase AC voltage from the generator 30 is generated by the rotation of the crankshaft 13.

Accordingly, when a user is stating up the engine 1, it is necessary to perform a predetermined starting operation (in the embodiment, this involves kick-starting), and cause the crankshaft 13 to rotate.

This battery existence determination processing is executed immediately after a starting operation has begun and the power supply voltage that is supplied from the power supply unit 2 reaches a voltage value (for example, 6V) that is required in order to activate the ECU 4, thereby activates the ECU 4.

There are two types of battery existence determination processing, namely, a first type in which the existence or otherwise of a battery is determined based on the power supply voltage values that are supplied from the power supply unit 2, and a second type in which the existence or otherwise of a battery is determined based on the crank signal (i.e., the crank signals after they have undergone waveform shaping) input situation, and either of these methods may be selected and used.

Hereinafter, firstly, a description will be given with reference made to the flowchart in FIG. 4 of the first type of battery existence determination processing.

(1) First Type (Battery Existence Determination Processing Based on Power Supply Voltage Values)

Figure 4:
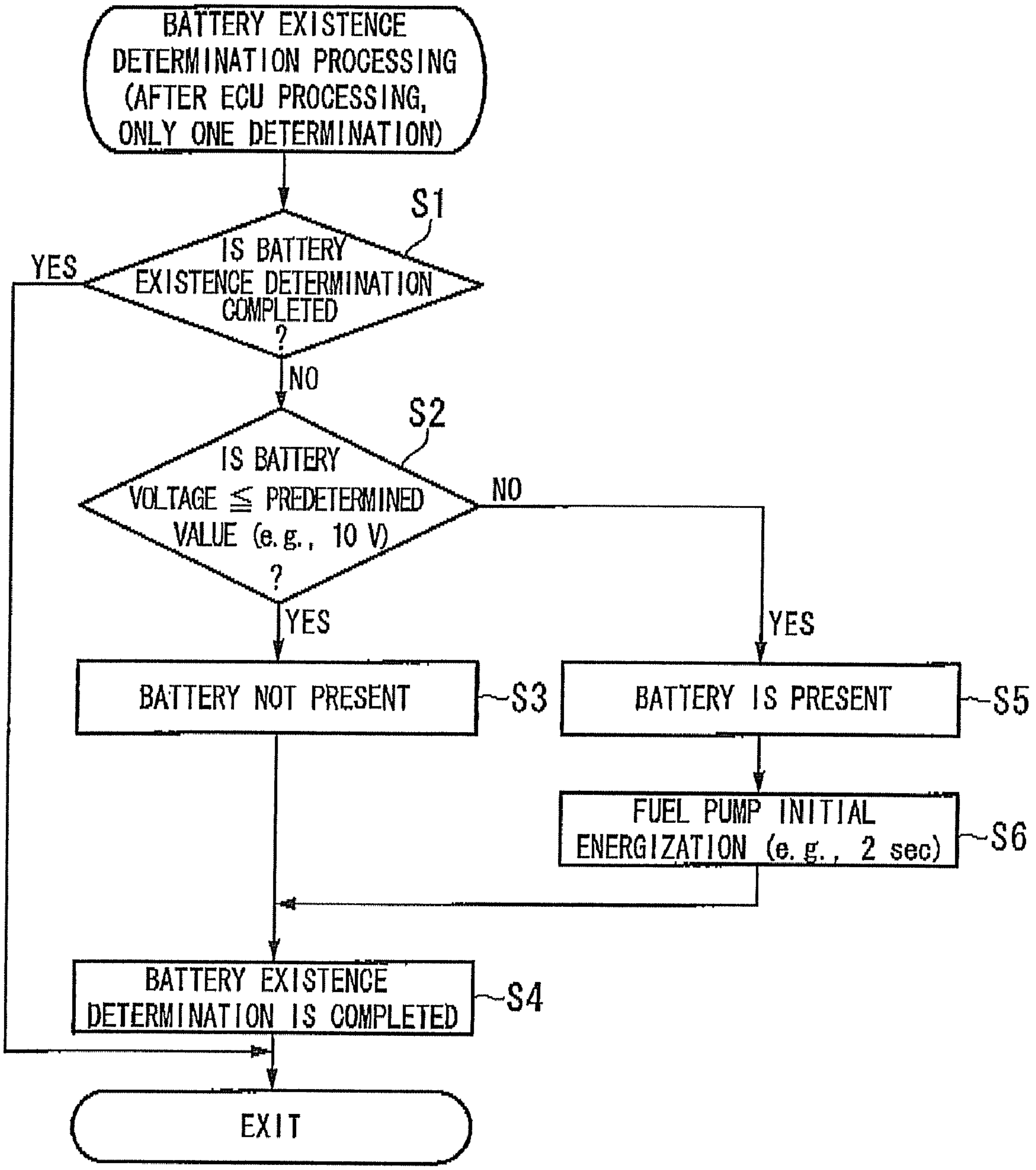
FIG. 4 is a flowchart relating to an operation of the internal combustion engine (ECU 4) according to an embodiment of the invention.

As shown in FIG. 4, after the CPU 53 has started up, the CPU 53 determines whether or not the battery existence determination processing has been completed (step S1). If the battery existence determination processing has been completed (i.e., if the determination result is YES), the battery existence determination processing is ended and the routine moves to the fuel/ignition control switching determination processing shown in FIG. 7 (FIG. 7 is described in detail below).

If, however, in step S1 the battery existence determination processing has not been completed (i.e., if the determination result is NO), the CPU 53 determines whether or not the power supply voltage value that is supplied from the power supply voltage unit 2 is less than or equal to a predetermined value (for example, 10V) (step S2) based on the power supply voltage values that are obtained from the power supply voltage measuring circuit 62.

Figure 7:
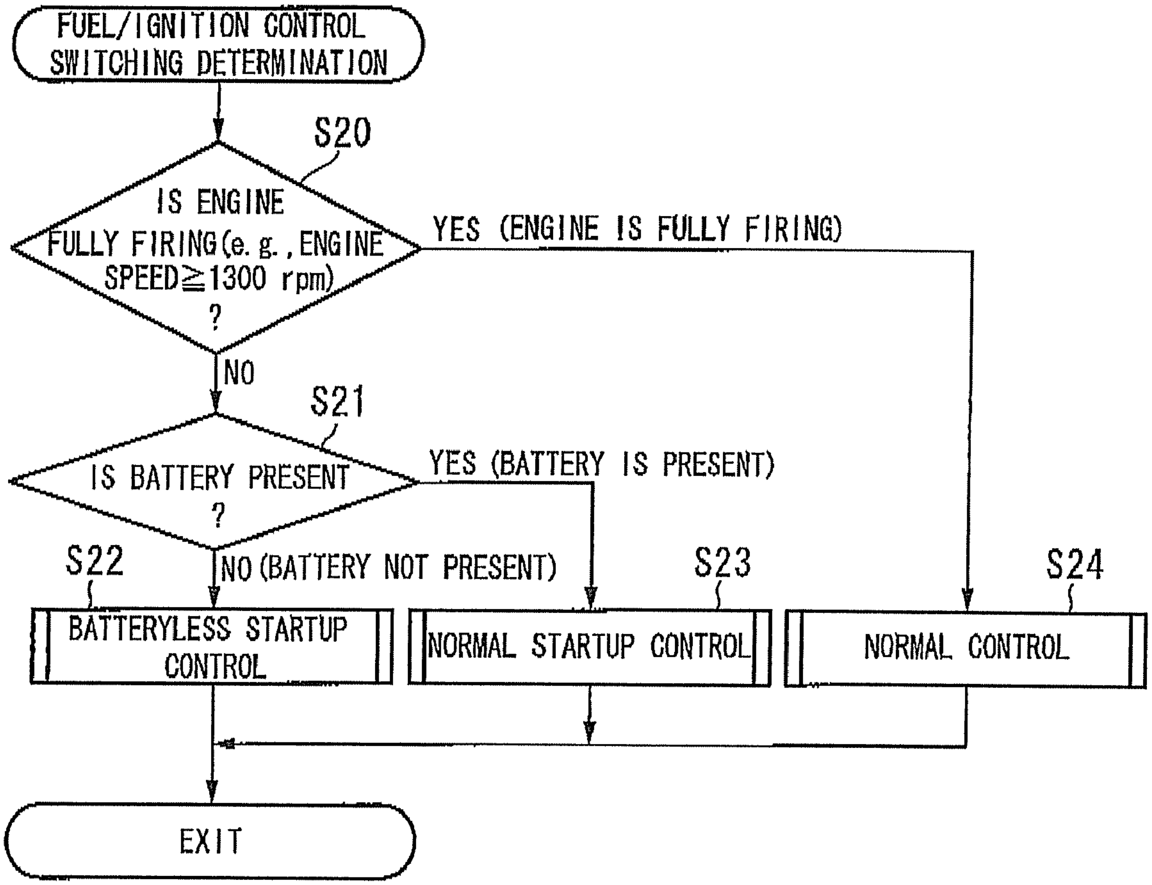
FIG. 7 is a flowchart relating to an operation of the internal combustion engine (ECU 4) according to an embodiment of the invention.

In step S2, if the power supply voltage value is less than or equal to the predetermined value (i.e., if the determination result is YES), the CPU 53 determines that there is no battery (step S3) and, as the battery existence determination processing has been completed, ends the battery existence determination processing and the routine moves to the fuel/ignition control switching determination processing shown in FIG. 7 (step S4).

If, however, in step S2, the power supply voltage value is greater than the predetermined value (i.e., if the determination result is NO), the CPU 53 determines that there is a battery (step S5) and performs the initial energizing of the fuel pump 41 for two seconds (step S6).

Specifically, the CPU 53 controls the timer 61 so as to set the initial energizing time (two seconds), and outputs a fuel supply control signal to the pump drive circuit 58.

As a result, a pump drive signal is supplied from the pump drive circuit 58 to the fuel pump 41, and the fuel pump 41 supplies fuel to the injector 22 for two seconds.

Next, after step S6, the CPU 53 moves to step S4 and, as the battery existence determination processing has been completed, ends the battery existence determination processing and the routine moves to the fuel/ignition control switching determination processing shown in FIG. 7.

In this manner, if the value of the power supply voltage when the ECU 4 (i.e., the CPU 53) is started up is less than or equal to a predetermined value, because no battery is present, it is possible to determine that the ECU 4 has been started by power generated by a manual operation, namely, without the use of a battery.

(2) Second Type (Battery Existence Determination Processing Based on Crank Signal Input Situation)

Next, a description will be given with reference made to the flowchart in FIG. 5 of the second type of battery existence determination processing.

Figure 5:
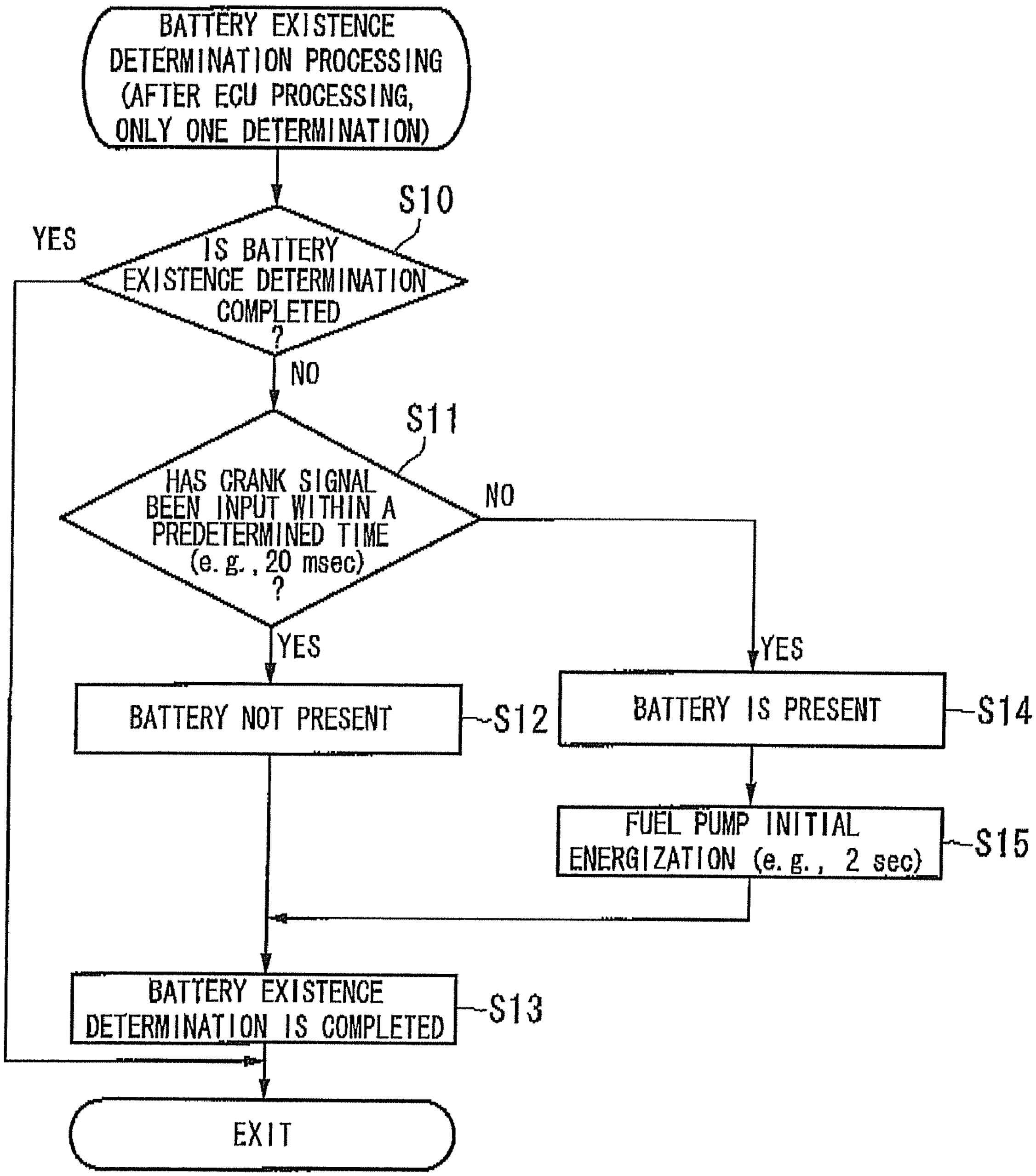
FIG. 5 is a flowchart relating to an operation of the internal combustion engine (ECU 4) according to an embodiment of the invention.

As shown in FIG. 5, after the CPU 53 has started up, the CPU 53 determines whether or not the battery existence determination processing has been completed (step S10). If the battery existence determination processing has been completed (i.e., if the determination result is YES), the battery existence determination processing is ended and the routine moves to the fuel/ignition control switching determination processing shown in FIG. 7.

If, however, in step S10 the battery existence determination processing has not been completed (i.e., if the determination result is NO), the CPU 53 determines whether or not a crank signal (namely, a crank signal that has undergone waveform shaping) input has been made within a predetermined time (for example, within 20 milliseconds) after startup (step S11).

In step S11, if a waveform-shaped crank signal has been input within a predetermined time after startup (i.e., if the determination result is YES), the CPU 53 determines that no battery is present (step S12) and, as the battery existence determination processing has been completed, ends the battery existence determination processing and the routine moves to the fuel/ignition control switching determination processing shown in FIG. 7 (step S13).

If, however, in step S11, a waveform-shaped crank signal has not been input within a predetermined time after startup (i.e., if the determination result is NO), the CPU 53 determines that a battery is present (step S14), and performs the initial energizing of the fuel pump 41 for two seconds (step S15).

Next, after step S15, the CPU 53 moves to step S13 and, as the battery existence determination processing has been completed, ends the battery existence determination processing and the routine moves to the fuel/ignition control switching determination processing shown in FIG. 7.

Figure 6A:
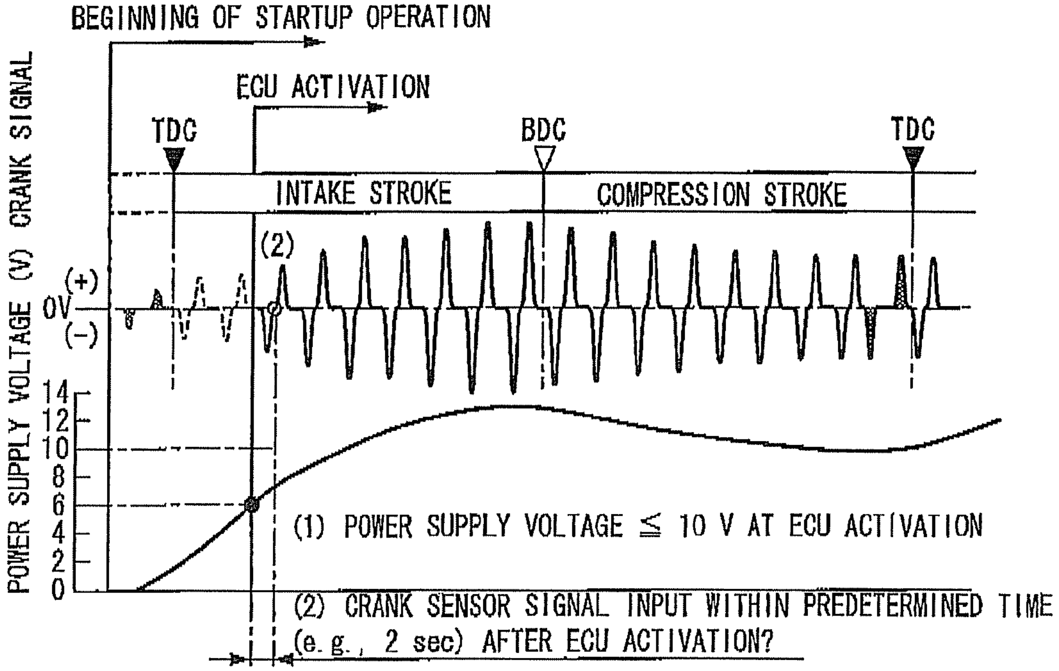
FIGS. 6A and 6B are explanatory diagrams relating to an operation of the internal combustion engine (ECU 4) according to an embodiment of the invention.

FIG. 6A is a timing chart showing a mutual relationship between a crank signal and a power supply voltage when startup cranking is performed by manual operation when no battery is installed.

Figure 6B:
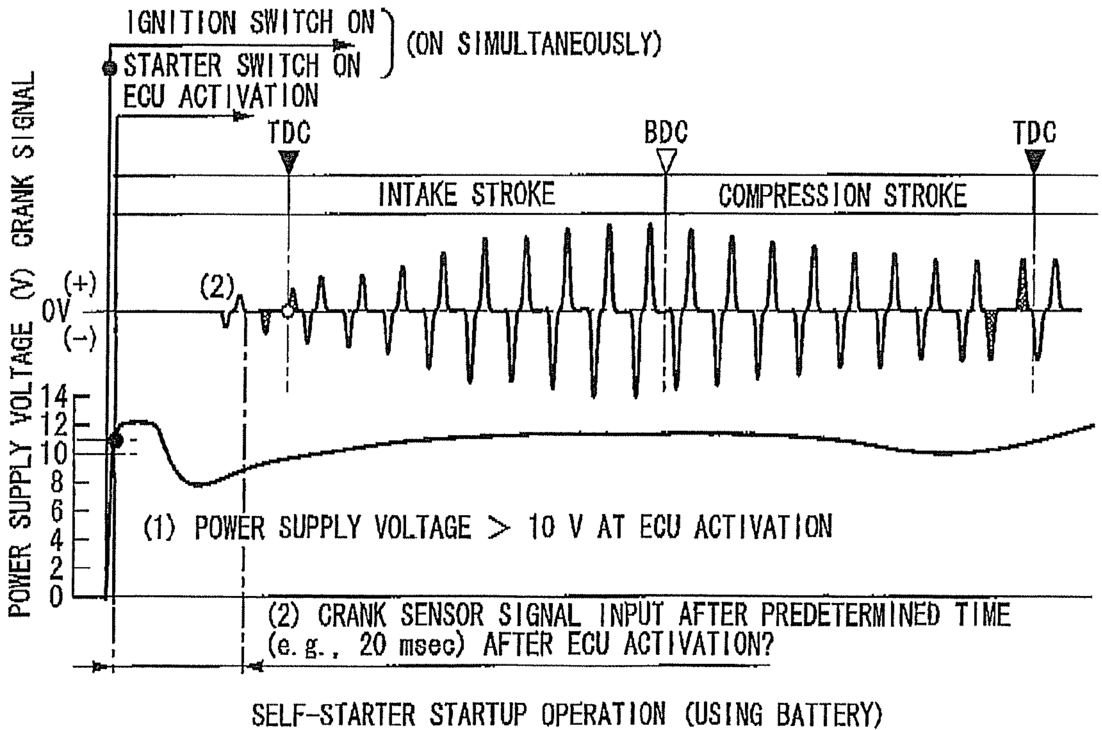

In contrast, FIG. 6B is a timing chart showing a mutual relationship between a crank signal and a power supply voltage when startup cranking is performed by a self-starter when a battery is installed.

As shown in FIG. 6A, when no battery is installed, a crank signal is generated within a predetermined time after the startup operation (i.e., the kick-starting) has begun and the power supply voltage has reached 6 V, and the ECU 4 (i.e., the CPU 53) has started up.

In contrast, as shown in FIG. 6B, when a battery is installed, after a starting operation has begun (i.e., after the ignition and the starter switch have been turned on), power supply voltage is immediately supplied to the ECU 4 and the ECU 4 (i.e., the CPU 53) is started up.

The crank signal is generated after a predetermined time has elapsed.

This is because, when starting cranking is performed by a self-starter when a battery is installed, even if both the ignition and the starter switch have been turned on at the same time (i.e., when cranking is begun as fast as possible after the ECU has started up), because a delay occurs before the cranking begins due to a delay in the response of the starter relay and a backlash in the idle gear between the starter motor shaft and the crankshaft, the crank signal is not generated within a predetermined time after the ECU startup.

In this manner, if a crank signal that has undergone waveform shaping is input within a predetermined time after the startup of the ECU 4 (i.e., the CPU 53), then it is determined that the ECU 4 has started up using power generated by a manual operation with no battery being installed, namely, a batteryless state is determined.

Fuel/Ignition Control Switching Determination Processing

Next, a description will be given with reference made to the flowchart in FIG. 7 of the fuel/ignition control switching determination processing that is performed after the above-described battery existence determination processing has ended.

As shown in FIG. 7, the CPU 53 firstly determines whether or not the engine is fully firing (step S20).

Specifically, based on the rotation count signal that is input from the rotation counter 51, the CPU 53 determines whether or not the engine is fully firing by determining whether or not the rotation count of the engine 1 (namely, of the crankshaft 13) is equal to or greater than a predetermined rotation count (for example, 1300 rpm).

In step S20, if the engine is not fully firing, namely, if the rotation count of the engine 1 is less than 1300 rpm (i.e., if the determination result is NO), the CPU 53 determines whether or not the result of the battery existence determination processing determined that a battery was present (step S21).

Next, in step S21, if the result of the battery existence determination processing determined that a battery was not present (i.e., if the determination result was NO), the CPU 53 moves to a batteryless startup control sub-routine (step S22).

This batteryless startup control is performed when no battery is installed. By controlling the energization sequence to each device associated with fuel injection, ignition, and fuel supply, it is possible to prevent any stopping of the electronic control functions of the CPU 53 that is caused by a reduction in the power supply voltage during startup, and ensure startability.

There are two types of batteryless startup control, namely, a first type and a second type, and firstly the first type of batteryless startup control will be described below with reference made to the flowchart in FIG. 8.

First Type of Batteryless Startup Control

Figure 8:
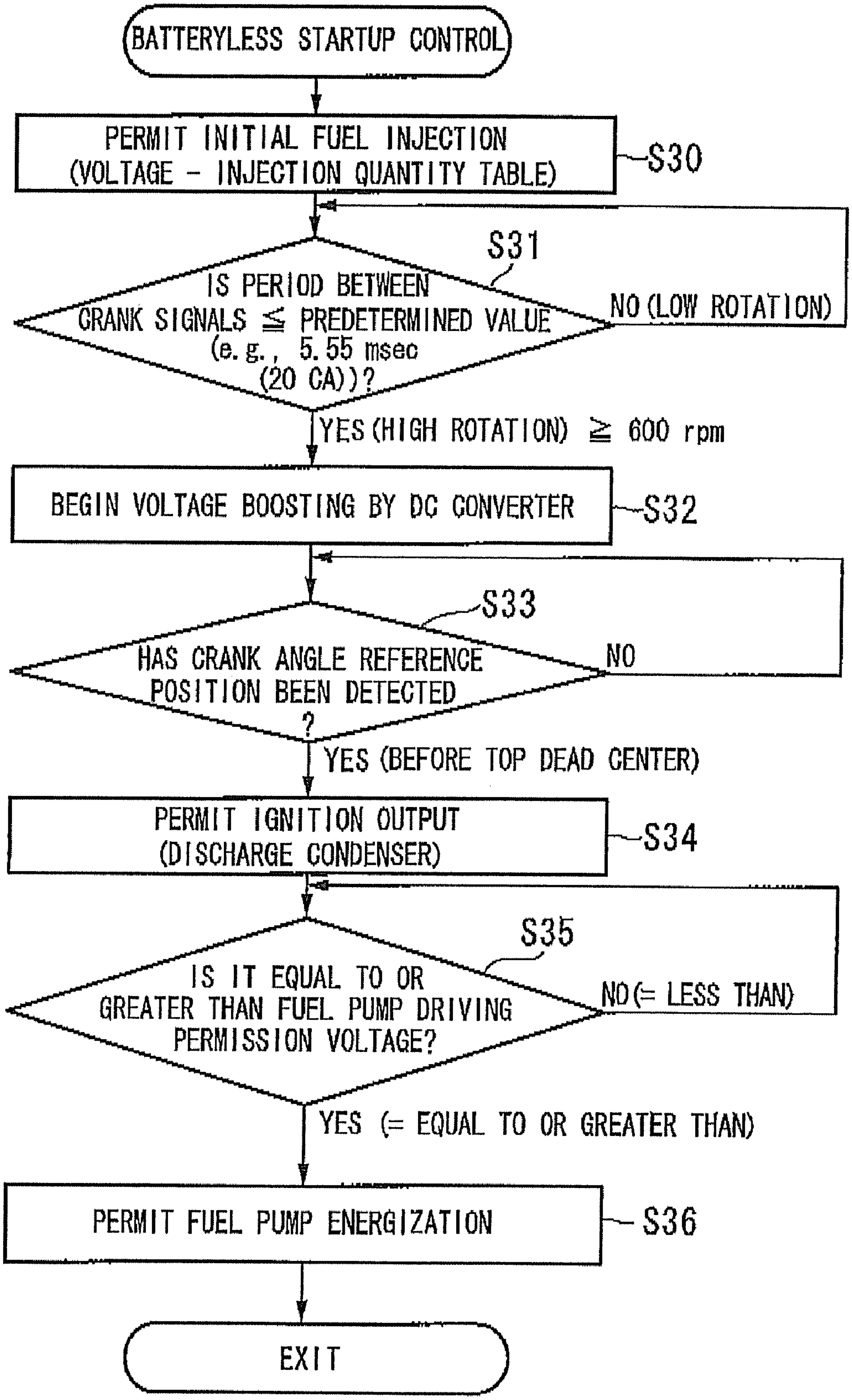
FIG. 8 is a flowchart relating to an operation of the internal combustion engine (ECU 4) according to an embodiment of the invention.

As shown in FIG. 8, when the batteryless startup control routine commences, the CPU 53 firstly gives permission for an initial fuel injection (step S30).

Specifically, a table showing mutual relationships between power supply voltage values and fuel injection quantities is stored in the ROM 59. The CPU 53 extracts from this table a fuel injection quantity that corresponds to the power supply voltage value obtained from the power supply voltage measuring circuit 62, and calculates the ultimate fuel injection quantity by amending the extracted fuel injection quantity based on a cooling water temperature value obtained from the A/D converter 52.

Next, the CPU 53 controls the timer 61 so as to set an initial injection injector drive time, and outputs a fuel injection control signal to the injector drive circuit 57 in order to cause fuel corresponding to the fuel injection quantity calculated in the manner described above to be injected.

As a result, an injector drive signal that corresponds to the fuel injection control signal is output from the injector drive circuit 57 to the injector 22 for the length of an initial injection injector drive time, and the initial fuel injection from the injector 22 is performed at engine startup.

Next, the CPU 53 determines whether or not a time between crank signals, namely, the time between falling edges of waveform-shaped crank signals which corresponds to the time it takes the crankshaft 13 to rotate 20° is less than or equal to a predetermined time (for example, 5.55 msec) (step S31).

In step S31, if the time between crank signals is less than or equal to 5.55 msec, namely, if the rotation count of the crankshaft 13 is equal to or greater than the high rate of 600 rpm (i.e., if the determination result is YES), the CPU 53 begins a voltage boosting operation by the DC converter 55 (step S32).

Specifically, the CPU 53 outputs to the oscillation circuit 54 a voltage boost control signal in order to start a voltage boosting operation by the DC converter 55, and the oscillation circuit 54 outputs a PWM signal having a predetermined frequency to the DC converter 55.

The DC converter 55 boosts the power supply voltage to 250 V and supplies it to the ignition condenser 56*a* by performing a switching operation in accordance with the PWM signal.

As a result, the ignition condenser 56*a* is charged, and when the condenser voltage reaches 250 V (i.e., when the ignition condenser 56*a* is saturated), the CPU 53 stops outputting the voltage booster control signal and stops the voltage boosting of the DC converter 55.

If, however, in step S31, the time between crank signals is greater than 5.55 msec, namely, if the rotation count is less than 600 rpm (i.e., if the determination result is NO), the CPU 53 repeats the processing of step S31.

Next, the CPU 53 determines whether or not the ignition timing has arrived (i.e., whether the crank angle reference position has been detected), based on the waveform-shaped cranks signals (step S33).

Figure 9:
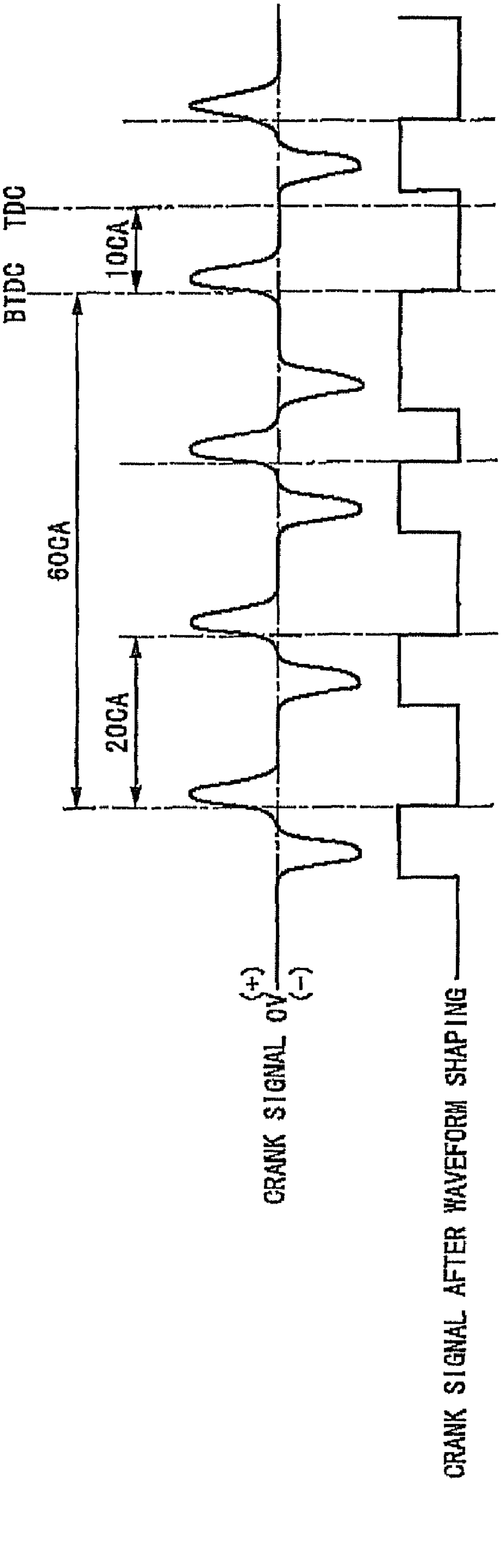
FIG. 9 is an explanatory diagram relating to an operation of the internal combustion engine (ECU 4) according to an embodiment of the invention.

As shown in FIG. 9, at the crank angle reference position, because the crank angle reference projection 30*a*$_1$ which has a large width passes the crank angle sensor 27, a rectangular wave pulse signal having a long high level period is generated.

When the fall edge of this rectangular wave pulse signal having a long high level period is detected, it is possible to determine that the crank angle reference position has been detected (i.e., that the ignition timing has arrived).

Immediately after startup, the CPU 53 performs processing in parallel to detect the crank angle reference position based on the crank signals that have undergone waveform shaping (i.e., on the rectangular wave pulse signals).

In this step S33, when the crank angle reference position has been detected, namely, when the ignition timing has arrived (i.e., if the determination result is YES), the CPU 53 permits ignition output (step S34).

Specifically, the CPU 53 outputs an ignition control signal in order to cause the spark plug 16 to generate a spark at the ignition timings, and switches the electrical discharge switch 56*b* to ON. The CPU 53 also causes the power with which the ignition condenser 56*a* has been charged to be discharged to the primary coil of the ignition coil 17.

As a result, the spark plug 16 generates a spark and the engine 1 is placed in a fully firing state.

If, however, in step S33, the ignition timing has not arrived (i.e., if the determination result is NO), the CPU 53 repeats the processing of step S33.

Next, the CPU 53 determines whether or not the power supply voltage value is equal to or greater than the drive permitting voltage of the fuel pump 41 (step S35). If the power supply voltage value is equal to or greater than this drive permitting voltage (i.e., if the determination result is YES), permission to energize the fuel pump 41 is given (step S36).

Specifically, the CPU 53 outputs a fuel supply control signal to the pump drive circuit 58, and the pump drive circuit 58 outputs a pump drive signal to the fuel pump 41 to cause fuel to be supplied to the injector 22.

As a result, fuel is supplied from the fuel pump 41 to the injector 22.

Moreover, after step S36 has ended, the CPU 53 ends the batteryless startup control and the routine returns to the fuel/ignition control switching determination processing shown in FIG. 7.

If, however, in step S35, the power supply voltage is less than the drive permitting voltage (i.e., if the determination result is NO), the CPU 53 returns to the processing of step S35.

In this manner, in the first type of batteryless startup control, each of the devices associated with fuel injection, ignition, and fuel supply are energized in an energization sequence made up of initial fuel injection, voltage boosting operation performed by the DC converter 55 (i.e., charging of the ignition condenser 56*a*), ignition output, and driving of the fuel pump 41, in order.

The effects of this first type of batteryless startup control will be described with reference made to FIG. 10.

Figure 10:
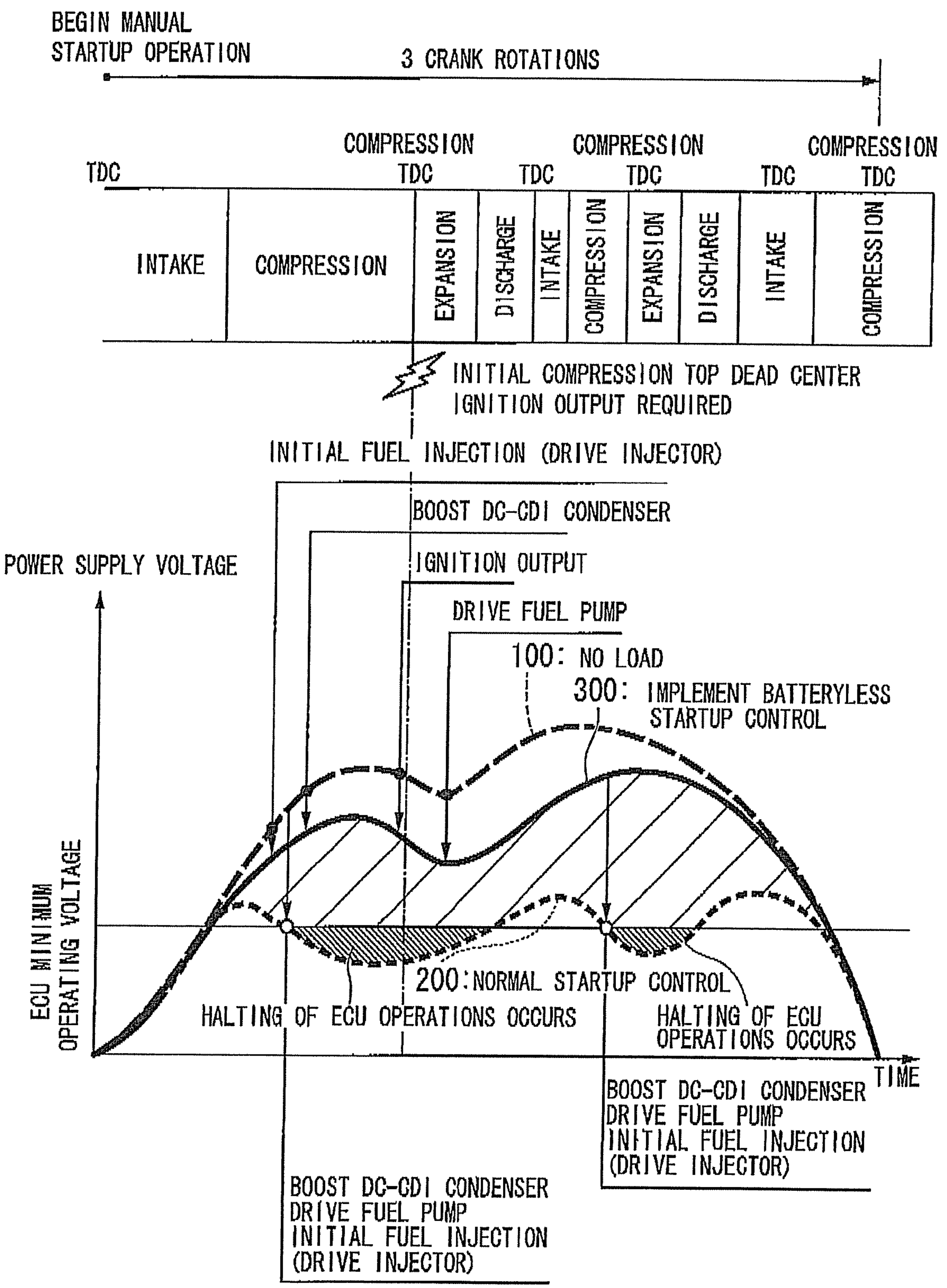
FIG. 10 is an explanatory diagram relating to an operation of the internal combustion engine (ECU 4) according to an embodiment of the invention.

FIG. 10 shows temporal changes in the power supply voltage that is supplied from the power supply unit 2 in a period from the commencement of a startup operation until the crankshaft has made three rotations.

In FIG. 10, reference numeral 100 shows changes in the power supply voltage in a non-load state. Reference numeral 200 shows changes in the power supply voltage when normal (i.e., conventional) startup control is performed, and Reference numeral 300 shows changes in the power supply voltage when the first type of batteryless startup control is performed.

In normal startup control, each of the devices associated with fuel injection, ignition, and fuel supply are energized in an energization sequence made up of voltage boosting operation performed by the DC converter 55 (i.e., charging of the ignition condenser 56*a*), driving of the fuel pump 41, initial fuel injection, and ignition output, in order.

As shown in FIG. 10, when normal startup control is performed, at the point when the voltage boosting operation performed by the DC converter 55 (i.e., charging of the ignition condenser 56*a*), driving of the fuel pump 41, and initial fuel injection have been performed in order, the power supply voltage drops below the minimum operating voltage of the CPU 53 and the electronic control functions of the CPU 53 are halted.

Because of this, at the top dead center TDC of the initial compression that requires an ignition output, the CPU 53 is unable to be activated and deteriorates into state in which startup is not possible.

In contrast, when the first type of batteryless startup control is performed, by performing the driving of the fuel pump 41, which has the greatest power consumption, last in the energization sequence, it is possible to prevent the power supply voltage dropping below the minimum operating voltage of the CPU 53 at the top dead center TDC of the initial compression that requires an ignition output.

Namely, it is possible to prevent the electronic control functions of the CPU 53 being halted, and to perform normal ignition output at the top dead center TDC of the initial compression so that startability can be ensured.

As described above according to the first type of batteryless startup control, it is possible to effectively use the limited voltage (i.e., the power supply voltage) generated by the generator 30 during a period from the commencement of the startup operation until the top dead center TDC of the initial compression. As a result, it is possible to ensure superior startability without this leading to an increase in the size of the generator 30 or in costs.

Moreover, during startup, because the existence or otherwise of a battery is determined, even if a self-starter method with a battery installed is used, if there is a reduction in the battery performance, because the above-described batteryless startup control is implemented, it is possible to ensure startability.

As understood from the above description, when the first type of batteryless startup control is implemented, prior to the fuel pump 41 being driven, the injector 22 is driven and initial fuel injection is performed.

Because of this, when residual fuel pressure from when the engine was run previously remains in the injector 22, initial fuel injection proceeds normally, and the consequent ignition output places the engine 1 in a fully firing state. However, if there is no residual fuel pressure, at the time of the initial fuel injection there is no fuel in the injection so that, even if there is a subsequent ignition output, there is a possibility that the engine 1 will not be completely firing.

However, even if there is a fuel-less injection at the time of the initial fuel injection, because the fuel pump 41 is driven after that, fuel injection proceeds normally in the next intake stroke so that the engine 1 is placed in a fully firing state.

Second Type of Batteryless Startup Control

Next, the second type of batteryless startup control will be described with reference made to the flowchart in FIG. 11.

Figure 11:
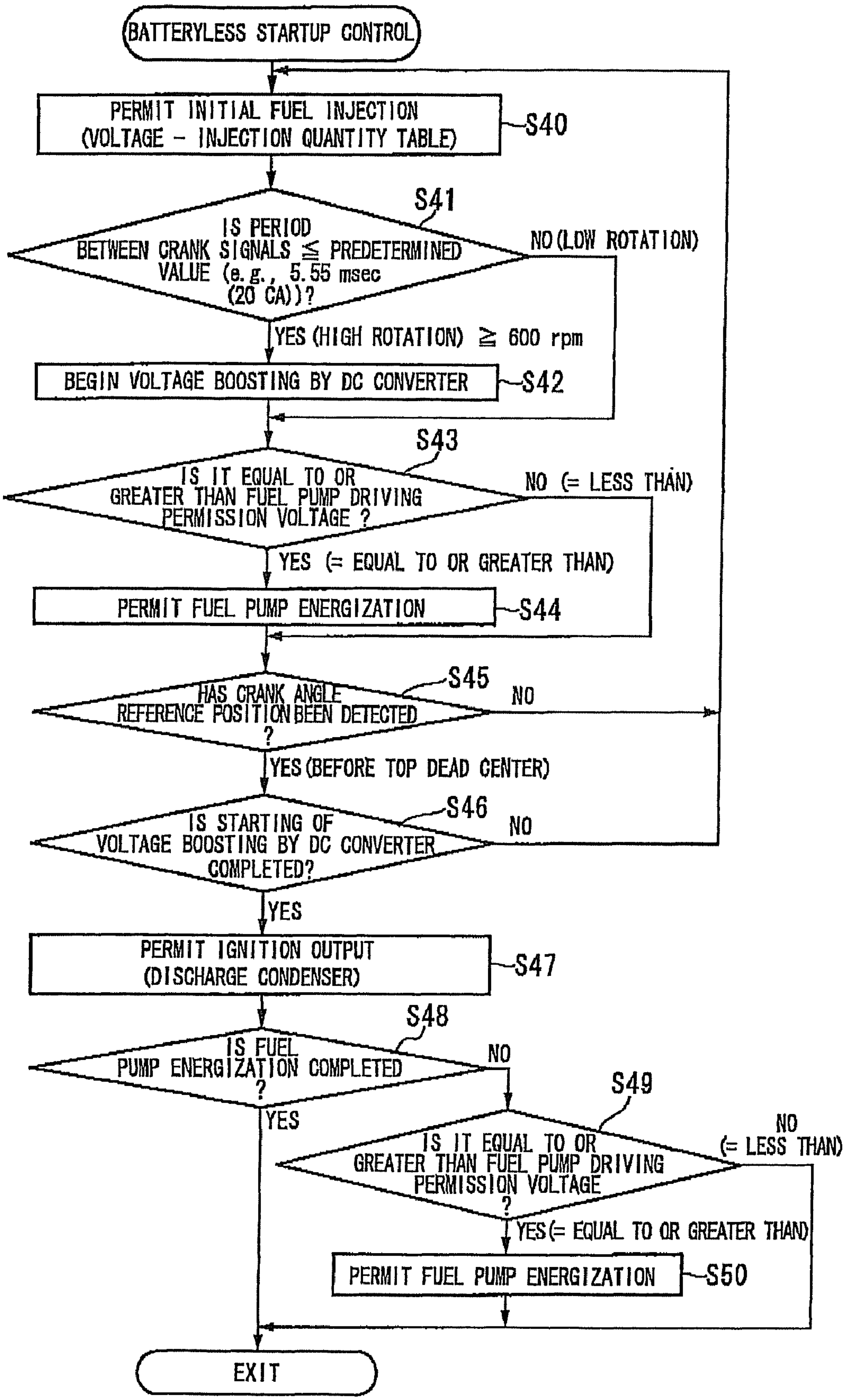
FIG. 11 is a flowchart relating to an operation of the internal combustion engine (ECU 4) according to an embodiment of the invention.

As shown in FIG. 11, when the batteryless stamp control routine commences, the CPU 53 firstly gives permission for an initial fuel injection (step S40).

The processing of this step S40 is the same as the processing of step S30 shown in FIG. 8.

Next, the CPU 53 determines whether or not a time between crank signals is less than or equal to a predetermined time (for example, 5.55 msec) (step S41).

In step S41, if the time between crank signals is less than or equal to 5.55 msec, namely, if the rotation count of the crankshaft 13 is equal to or greater than the high rate of 600 rpm (i.e., if the determination result is YES), the CPU 53 begins a voltage boosting operation by the DC converter 55 (step S42).

The processing of this step S42 is the same as the processing of step S32 shown in FIG. 8.

If, however, in step S41, the time between crank signals is greater than 5.55 msec, namely, if the rotation count is less than 600 rpm (i.e., if the determination result is NO), the CPU 53 moves to the processing of step S43.

Next, the CPU 53 determines whether or not the power supply voltage value is equal to or greater than the drive permitting voltage of the fuel pump 41 (step S43). If the power supply voltage value is equal to or greater than this drive permitting voltage (i.e., if the determination result is YES), permission to energize the fuel pump 41 is given (step S44).

The processing of this step S44 is the same as the processing of step S36 shown in FIG. 8.

If, however, in step S43, the power supply voltage is less than the drive permitting voltage (i.e., if the determination result is NO), the CPU 53 moves to the processing of step S45.

Next, the CPU 53 determines whether or not the ignition timing has arrived (i.e., whether the crank angle reference position has been detected), based on the waveform-shaped crank signals (step S45).

In this step S45, when the crank angle reference position has been detected, namely, when the ignition timing has arrived (i.e., if the determination result is YES), the CPU 53 determines whether or not the commencement of voltage boosting by the DC converter 55 has been completed (step S46).

In this step S46, if it is determined that the commencement of voltage boosting by the DC converter 55 has been completed (i.e., if the determination result is YES), the CPU 53 permits ignition output (step S47).

The processing of this step S47 is the same as the processing of step S34 shown in FIG. 8.

If, however, in step S45, the ignition timing has not arrived (i.e., if the determination result is NO), the CPU 53 returns to the processing of step S40.

Moreover, in step S46, if it is determined that the commencement of voltage boosting by the DC converter 55 has not been completed (i.e., if the determination result is NO), the CPU 53 returns to the processing of step S40.

Next, the CPU 53 determines whether or not the energizing of the fuel pump 41 has been completed (step S48). If the energizing of the fuel pump 41 has been completed (i.e., if the determination result is YES), the CPU 53 ends the batteryless startup control and returns to the fuel/ignition control switching determination processing shown in FIG. 7.

If, however, in step S48, it is determined that the energizing of the fuel pump 41 has not been completed (i.e., if the determination result is NO), the CPU 53 determines whether or not the power supply voltage value is equal to or greater than the drive permitting voltage of the fuel pump 41 (step S49).

In this step S49, if the power supply voltage value is equal to or greater than this drive permitting voltage (i.e., if the determination result is YES), the CPU 53 gives permission to energize the fuel pump 41 (step S50), and the CPU 53 ends the batteryless startup control and returns to the fuel/ignition control switching determination processing shown in FIG. 7.

If, however, in step S49, the power supply voltage value is less than the drive permitting voltage (i.e., if the determination result is NO), the CPU 53 ends the batteryless startup control and reties to the fuel/ignition control switching determination processing shown in FIG. 7.

As described above, in the second type of batteryless startup control, each of the devices associated with fuel injection, ignition, and fuel supply are energized in an energization sequence in which (1) initial fuel injection, (2) voltage boosting operation performed by the DC converter 55 (i.e., charging of the ignition condenser 56*a*) are performed first, and if the power supply voltage is equal to or greater than the drive permitting voltage of the fuel pump 41, these are followed by driving of the fuel pump 41, and (3) ignition output are performed, in order.

In this second type of batteryless startup control as well, in the same way as in the first type, it is possible to effectively use the limited voltage (i.e., the power supply voltage) generated by the generator 30 during a period from the commencement of the startup operation until the top dead center TDC of the initial compression.

As a result, it is possible to ensure superior startability without this leading to an increase in the size of the generator 30 or in costs.

Figure 12:
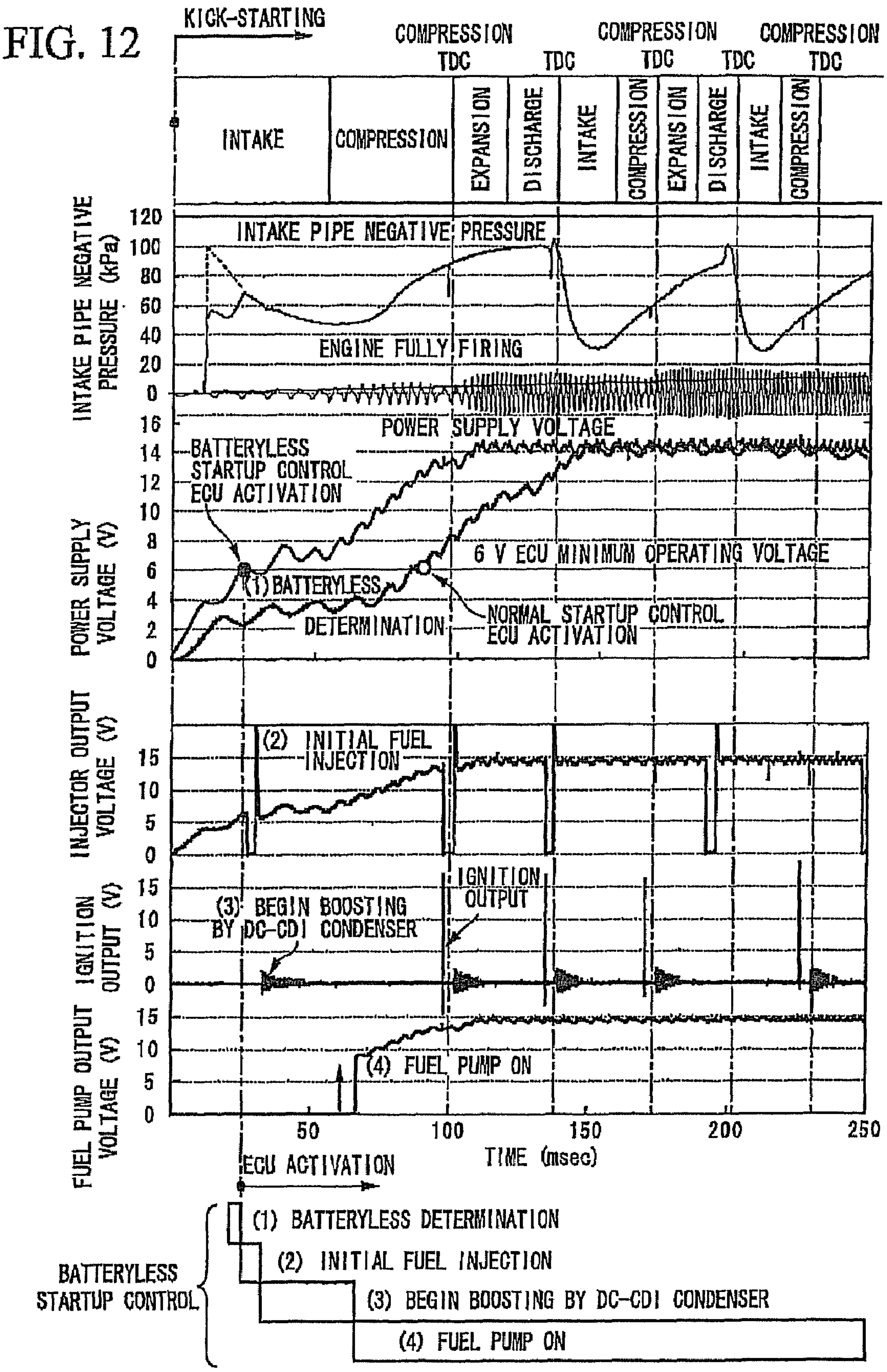
FIG. 12 is an explanatory diagram relating to an operation of the internal combustion engine (ECU 4) according to an embodiment of the invention.

FIG. 12 shows experimental data showing temporal changes after the commencement of a startup (i.e., kick-starting) operation in the intake pressure signal, the crank signal, the power supply voltage, the injector output voltage, the ignition output voltage, and the fuel pump output voltage when the second type of batteryless control is implemented, and also temporal changes in the power supply voltage when normal (i.e., conventional) startup control is performed.

As understood from FIG. 12, from the commencement of a startup operation until the ignition output at the top dead center TDC of the initial compression stroke, there is only one crank rotation, however, by effectively using the limited voltage (i.e., the power supply voltage) generated by the generator 30, it is possible to prevent any halting of the functions that is caused by a reduction in the power supply voltage of the CPU 53, and to carry out the initial fuel injection during an intake stroke, and to also reliably perform ignition output at the top dead center TDC of the initial compression.

As a result, it is possible to ensure a superior startup.

In contrast, when normal (i.e., conventional) startup control is performed, the CPU is activated before the top dead center TDC of the initial compression, and it was found that startability could not be ensured.

The batteryless startup control of step S22 in FIG. 7 has been described above. The description will now return to FIG. 7.

In step S21 in FIG. 7, if the result of the battery existence determination processing is that a battery is present (i.e., if the determination result is YES), the CPU 53 moves to a normal startup control sub-routine (step S23).

In this normal startup control, as described above, each of the devices associated with fuel injection, ignition, and fuel supply are energized in an energization sequence made up of voltage boosting operation performed by the DC converter 55 (i.e., charging of the ignition condenser 56*a*), driving of the fuel pump 41, initial fuel injection, and ignition output, in order.

Figure 13:
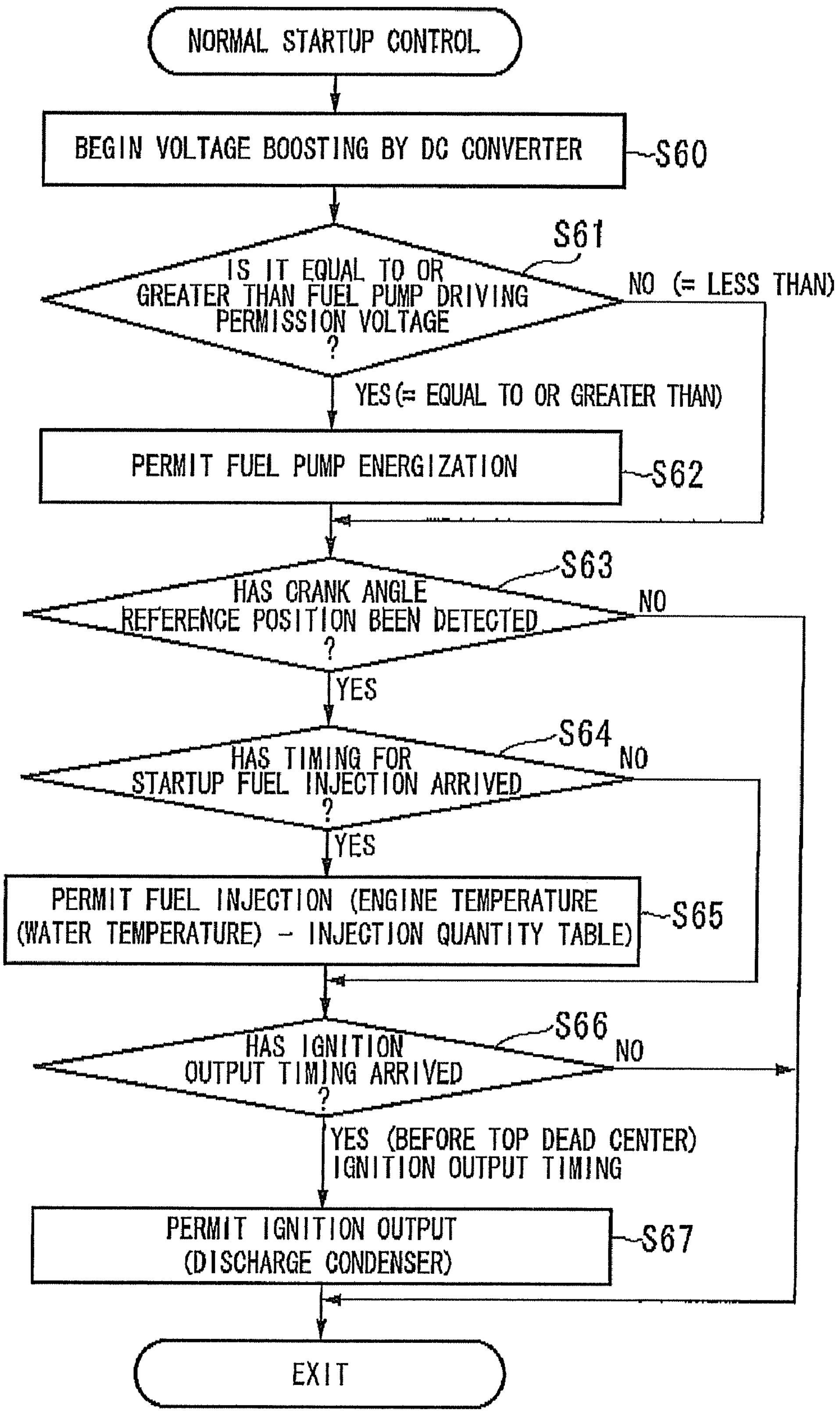
FIG. 13 is a flowchart relating to an operation of the internal combustion engine (ECU 4) according to an embodiment of the invention.

FIG. 13 is an operational flowchart showing normal startup control.

As shown in FIG. 13, when the CPU 53 proceeds to normal startup control, firstly, the CPU 53 causes a voltage boosting operation to be started by the DC converter 55 (step S60).

The CPU 53 then determines whether or not the power supply voltage is equal to or greater than the drive permitting voltage of the fuel pump 41 (step S61).

In this step S61, if the power supply voltage is equal to or greater than the drive permitting voltage (i.e., if the determination result is YES), the CPU 53 gives percussion for the fuel pump 41 to be energized (step S62). If, however, the power supply voltage is less than the drive permitting voltage (i.e., if the determination result is NO), the routine moves to the processing of step S63.

Next, the CPU 53 determines whether or not the crank angle reference position has been detected (step S63).

In this step S63, if the crank angle reference position has not been detected (i.e., if the determination result is NO), the CPU 53 ends the normal startup control and returns to the fuel/ignition control switching determination processing shown in FIG. 7.

If, however, the crank angle reference position has been detected (i.e., if the determination result is YES), the CPU 53 determines whether or not the timing for fuel injection during startup has arrived (step S64).

In step S64, if the timing for fuel injection during startup has arrived (i.e., if the determination result is YES), the CPU 53 gives permission for startup fuel injection to be performed (step S65).

If, however, in step S64, if the timing for fuel injection during startup has not arrived (i.e., if the determination result is NO), the CPU 53 moves to the processing of step S66.

The CPU 53 then determines whether or not the timing for ignition output has arrived (step S66). If the timing for ignition output has arrived (i.e., if the determination result is YES), the CPU 53 gives permission for ignition output to be performed (step S67), and ends the normal startup control and returns to the fuel/ignition control switching determination processing shown in FIG. 7.

If, however, in step S67, the timing for ignition output has not arrived (i.e., if the determination result is NO), the CPU 53 ends the normal startup control and returns to the fuel/ignition control switching determination processing shown in FIG. 7.

The normal startup control of step S23 in FIG. 7 has been described above. The description will now return to FIG. 7.

In step S20 in FIG. 7, if the engine 1 is in a fully firing state (i.e., if the determination result is YES), the CPU 53 performs normal running control (step S24).

Here, normal running control refers to performing fuel injection, ignition, and fuel supply in accordance with the engine speed, the throttle opening angle, and the intake pressure.

As described above, according to the embodiment, during startup control of the engine 1, it is possible to avoid stoppages of the electronic control functions of the CPU 53 that are caused by a reduction in the power supply voltage during startup, and ensure startability.

While preferred embodiments of the invention have been described and illustrated above, these are exemplary of the invention and are not to be considered as limiting. Additions, omissions, substitutions, and other modifications can be made without departing from the spirit or scope of the invention. Accordingly, the invention is not to be considered as limited by the foregoing description and is only limited by the scope of the appended claims.

What is claimed is:

1. A control apparatus for an internal combustion engine, comprising:
- a fuel injection unit provided in the internal combustion engine;
- an ignition unit provided in the internal combustion engine;
- a crank angle detection unit that is provided in the internal combustion engine, and that outputs a crank signal each time a crankshaft rotates by a predetermined angle;
- a fuel pump used to supply fuel to the fuel injection unit;
- a booster unit that boosts a power supply voltage;
- an ignition discharge unit that charges an ignition condenser using the boosted power supply voltage, and discharges power with which the ignition condenser has been charged to the ignition unit at the ignition timings; and
- a control unit structured to control the fuel injection unit, the ignition unit, and the fuel pump, to ascertain ignition timings based on the crank signals output from the crank angle detection unit, and to perform a startup control sequence that comprising:
  - fuel injection processing in which the fuel injection unit is driven so as to perform the initial fuel injection;
  - voltage boosting processing in which, after the fuel injection processing, the booster unit is controlled so as to boost the power supply voltage;
  - ignition processing in which, after the voltage boosting processing, the ignition discharge unit is controlled so as to discharge to the ignition unit the power with which the ignition condenser has been charged when the ignition timings arrive; and
  - fuel supply processing in which, after the ignition processing, the fuel pump is driven so as to supply fuel to the fuel injection unit.

2. The control apparatus for an internal combustion engine according to claim 1, wherein
- after the fuel injection processing, the control unit determines based on the crank signals whether or not a period between the crank signal from the previous crank signal detection and the crank signal from the current crank signal detection is equal to or less than a predetermined value, and when the period between the crank signals is equal to or less than the predetermined value, the control unit performs the voltage boosting processing.

3. The control apparatus for an internal combustion engine according to claim 1, further comprising:
- a power supply voltage measuring unit that measures the power supply voltage, wherein
- after the ignition processing, the control unit determines whether or not the power supply voltage is equal to or greater than a fuel pump drive permitting voltage, and when the power supply voltage is equal to or greater than the fuel pump drive permitting voltage, the control unit performs the fuel supply processing.

4. The control apparatus for an internal combustion engine according to claim 1, wherein
- after the control unit has been activated, the control unit performs battery existence determination processing to determine whether a battery that supplies the power supply voltage is present, and when the control unit determined that no battery is present, the control unit executes the startup control sequence.

5. The control apparatus for an internal combustion engine according to claim 4, further comprising:
- a power supply voltage measuring unit that measures the power supply voltage, wherein
- in the battery existence determination processing, when the control unit determines that the power supply voltage at activation is equal to or less than a predetermined value, the control unit determines that no battery is present.

6. The control apparatus for an internal combustion engine according to claim 4, wherein
- in the battery existence determination processing, when the crank signal is input within a predetermined time after activation, the control unit determines that no battery is present.

7. A control apparatus for an internal combustion engine, comprising:
- a fuel injection unit provided in the internal combustion engine;
- an ignition unit provided in the internal combustion engine;
- a crank angle detection unit that is provided in the internal combustion engine, and that outputs a crank signal each time a crankshaft rotates by a predetermined angle;
- a fuel pump used to supply fuel to the fuel injection unit;
- a booster unit that boosts a power supply voltage;
- an ignition discharge unit that charges an ignition condenser using the boosted power supply voltage, and discharges power with which the ignition condenser has been charged to the ignition unit at the ignition timings;
- a power supply voltage measuring unit that measures the power supply voltage;
- a control unit structured to control the fuel injection unit, the ignition unit, and the fuel pump, to ascertain ignition timings based on the crank signals output from the crank angle detection unit, and to perform a startup control sequence comprising:
  - fuel injection processing in which the fuel injection unit is driven so as to perform the initial fuel injection;
  - voltage boosting processing in which, after the fuel injection processing, the booster unit is controlled so as to boost the power supply voltage; and fuel supply processing in which, after the voltage boosting processing, when the power supply voltage is equal to or greater than the fuel pump drive permitting voltage, the fuel pump is driven so as to supply fuel to the fuel injection unit.

8. The control apparatus for an internal combustion engine according to claim 7, wherein after the fuel injection processing, the control unit determines based on the crank signals whether or not a period between the crank signal from the previous crank signal detection and the crank signal from the current crank signal detection is equal to or less than a predetermined value, and when the period between the crank signals is equal to or less than the predetermined value, the control unit performs the voltage boosting processing, wherein when the period between the crank signals is greater than the predetermined value, the control unit does not perform the voltage boosting processing, and wherein, when the power supply voltage is equal to or greater than the fuel pump drive permitting voltage, the control unit performs the fuel supply processing.

9. The control apparatus for an internal combustion engine according to claim 7, wherein after the fuel supply processing, when the ignition timing arrives, the control unit determines whether or not the voltage boosting processing has been executed, and when the voltage boosting processing has been executed, the control unit controls the ignition discharge unit so as to discharge to the ignition unit the power with which the ignition condenser has been charged.

10. The control apparatus for an internal combustion engine according to claim 9, wherein when the power supply voltage is greater than the fuel pump drive permitting voltage, the control unit omits the fuel supply processing, and when the ignition timing arrives, the control unit determines whether or not the voltage boosting processing has been executed, and when the voltage boosting processing has been executed, the control unit performs the ignition processing.

11. The control apparatus for an internal combustion engine according to claim 10, wherein after the ignition processing, the control unit determines whether or not the fuel supply processing has been executed, and when the fuel supply processing has not been executed, and when the power supply voltage is equal to or greater than the fuel pump drive permitting voltage, the control unit performs the fuel supply processing.

12. The control apparatus for an internal combustion engine according to claim 7, wherein after the control unit has been activated, the control unit performs battery existence determination processing to determine whether a battery that supplies the power supply voltage is present, and if the control unit determined that no battery is present, the control unit executes the startup control sequence.

13. The control apparatus for an internal combustion engine according to claim 12, further comprising:

a power supply voltage measuring unit that measures the power supply voltage, wherein in the battery existence determination processing, when the control unit determines that the power supply voltage at activation is equal to or less than a predetermined value, the control unit determines that no battery is present.

14. The control apparatus for an internal combustion engine according to claim 12, wherein in the battery existence determination processing, when the crank signal is input within a predetermined time after activation, the control unit determines that no battery is present.

* * * * *